(12) United States Patent
Manula et al.

(10) Patent No.: US 8,589,610 B2
(45) Date of Patent: Nov. 19, 2013

(54) METHOD AND SYSTEM FOR RECEIVING COMMANDS USING A SCOREBOARD ON AN INFINIBAND HOST CHANNEL ADAPTOR

(75) Inventors: Brian Edward Manula, Oslo (NO); Magne Vigulf Sandven, Ski (NO); Haakon Ording Bugge, Oslo (NO)

(73) Assignee: Oracle International Corporation, Redwood Shores, CA (US)

( * ) Notice: Subject to any disclaimer, the term of this patent is extended or adjusted under 35 U.S.C. 154(b) by 171 days.

(21) Appl. No.: 13/149,436

(22) Filed: May 31, 2011

(65) Prior Publication Data
US 2012/0311208 A1 Dec. 6, 2012

(51) Int. Cl.
*G06F 13/00* (2006.01)
*G06F 13/364* (2006.01)

(52) U.S. Cl.
CPC .................................... *G06F 13/364* (2013.01)
USPC ....................................................... 710/107

(58) Field of Classification Search
USPC ............... 710/104–110, 52–57; 711/170–173
See application file for complete search history.

(56) References Cited

U.S. PATENT DOCUMENTS

| | | | |
|---|---|---|---|
| 6,459,698 B1 | 10/2002 | Acharya | |
| 6,563,790 B1 | 5/2003 | Yu et al. | |
| 6,741,559 B1 | 5/2004 | Smeulders et al. | |
| 6,789,143 B2 * | 9/2004 | Craddock et al. | 710/54 |
| 6,917,987 B2 * | 7/2005 | Parthasarathy et al. | 709/249 |
| 7,136,353 B2 | 11/2006 | Ha et al. | |
| 7,330,918 B2 * | 2/2008 | Yamamoto et al. | 710/56 |
| 7,496,698 B2 * | 2/2009 | Biran et al. | 710/52 |
| 7,609,636 B1 | 10/2009 | Mott | |
| 7,742,497 B2 | 6/2010 | Ganti et al. | |
| 7,769,015 B2 | 8/2010 | Huang et al. | |
| 7,782,805 B1 | 8/2010 | Belhadj et al. | |
| 7,787,366 B2 | 8/2010 | Cuffaro et al. | |
| 7,817,634 B2 | 10/2010 | Coffman et al. | |
| 7,830,919 B1 | 11/2010 | Thompson | |
| 7,899,050 B2 * | 3/2011 | Craddock et al. | 370/390 |
| 8,244,946 B2 | 8/2012 | Gupta et al. | |
| 8,255,475 B2 | 8/2012 | Kagan et al. | |
| 8,259,576 B2 | 9/2012 | Lee et al. | |
| 8,259,746 B2 | 9/2012 | Lo et al. | |
| 8,274,976 B2 | 9/2012 | Aloni et al. | |

(Continued)

OTHER PUBLICATIONS

Pfister, Gregory; "An Introduction to the Infiniband Architecture"; IBM Enterprise Server Group, Chapter 42, pp. 617-632 (2002).

(Continued)

*Primary Examiner* — Raymond Phan
(74) *Attorney, Agent, or Firm* — Osha Liang LLP

(57) ABSTRACT

A method for processing commands on a host channel adapter includes a host channel adapter receiving data from a host connected to the host channel adapter. The command includes an instruction, identification of packet data, and a length field. The host channel adapter extracts a length of the command from the length field, generates a scoreboard mask based on the length, where the scoreboard mask includes unused bits in the scoreboard preset, and sets, with each portion of the data received, a corresponding bit in a scoreboard. The host channel adapter further determines that the size of the data received for the command matches the length using the scoreboard, issues a kick on the host channel adapter when a size of the data received for the command matches the length, executes, in response to the kick, the instruction on a pipeline, and sends the packet data on a network.

19 Claims, 12 Drawing Sheets

(56) References Cited

U.S. PATENT DOCUMENTS

| | | |
|---|---|---|
| 8,296,386 B1 | 10/2012 | Micalizzi, Jr. |
| 2001/0036185 A1 | 11/2001 | Dempo |
| 2003/0101158 A1 | 5/2003 | Pinto et al. |
| 2005/0018669 A1 | 1/2005 | Arndt et al. |
| 2005/0060443 A1* | 3/2005 | Rosner ............... 710/33 |
| 2005/0135419 A1 | 6/2005 | Pullen et al. |
| 2005/0223118 A1 | 10/2005 | Tucker et al. |
| 2007/0008886 A1 | 1/2007 | Chen et al. |
| 2007/0019665 A1 | 1/2007 | Benveniste |
| 2007/0165672 A1 | 7/2007 | Keels et al. |
| 2007/0223472 A1 | 9/2007 | Tachibana et al. |
| 2007/0223483 A1 | 9/2007 | Huang et al. |
| 2007/0242686 A1 | 10/2007 | Zegers et al. |
| 2008/0140984 A1* | 6/2008 | Shearer ............... 711/173 |
| 2008/0168194 A1* | 7/2008 | Gregg et al. ............ 710/52 |
| 2009/0125604 A1 | 5/2009 | Chang et al. |
| 2011/0216648 A1 | 9/2011 | Mehrotra et al. |
| 2012/0239832 A1 | 9/2012 | Subramanian et al. |

OTHER PUBLICATIONS

Shanley, Tom; "Infiniband Network Architecture", MindShare, Inc., Chapter 1, pp. 9-24 (2003).

Shanley, Tom; "Infiniband Network Architecture", MindShare, Inc., Chapters 3-6, pp. 31-129 (2003).

Shanley, Tom; "Infiniband Network Architecture", MindShare, Inc., Chapter 13, pp. 259-289 (2003).

* cited by examiner

|  | Sequence | Scoreboard | Scoreboard Mask | Scoreboard Check Result | Write to Scoreboard |
|---|---|---|---|---|---|
| Step 1 | Initialization |  |  |  | 40'h00_0000_0000 |
| Step 2 | Receive page at offset 12'h10 | 40'h00_0000_0000 | 40'h00_0000_0004 | 40'h00_0000_0004 | 40'h00_0000_0004 |
| Step 3 | Receive page at offset 12'h20-0x38 | 40'h00_0000_0004 | 40'h00_0000_00f0 | 40'h00_0000_00f4 | 40'h00_0000_00f4 |
| Step 4 | Receive page at offset 12'h0 (length field = 16B) | 40'h00_0000_00f4 | 40'hff_ffff_fc01 | 40'hff_ffff_fcf5 | 40'hff_ffff_fcf5 |
| Step 5 | Receive page at offset 12'h8 | 40'hff_ffff_fcf5 | 40'h00_0000_0002 | 40'hff_ffff_fcf7 | 40'hff_ffff_fcf7 |
| Step 6 | Receive page at offset 12'h18 | 40'hff_ffff_fcf7 | 40'h00_0000_0008 | 40'hff_ffff_fcff | 40'hff_ffff_fcff |
| Step 7 | Receive page at offset 12'h40-12'h48 | 40'hff_ffff_fcff | 40'h00_0000_0030 | 40'hff_ffff_ffff→Kick |  |

FIG. 11B

METHOD AND SYSTEM FOR RECEIVING COMMANDS USING A SCOREBOARD ON AN INFINIBAND HOST CHANNEL ADAPTOR

CROSS-REFERENCE TO RELATED APPLICATIONS

The present application contains subject matter that may be related to the subject matter in the following U.S. patent applications, which are both assigned to a common assignee and are both incorporated by reference in their entirety: "Method and System for Infiniband® Host Channel Adapter Quality of Service" Ser. No. 13/149,449 filed on May 31, 2011; and "Method and System for Temporary Data Unit Storage on Infiniband® Host Channel Adapter" Ser. No. 13/149,483 filed on May 31, 2011.

BACKGROUND

The Infiniband® network includes nodes that communicate through a channel-based switched fabric (Infiniband® is a registered trademark of Infiniband Trade Association, located in Beaverton, Oreg.). For example, the nodes may be a host, an input/output subsystem, or a router which connects to another network. The switched fabric is made of a collection of switches, routers, and links that connect a set of channel adapters. The channel adapters form an interface between the switched fabric and the nodes. The channel adapter of the host is referred to as a host channel adapter. The channel adapter of an I/O subsystem is referred to as a target channel adapter.

In Infiniband®, two processes communicate using a queue pair. A queue pair includes a send queue and a receive queue. Specifically, in order for a process to send a message to another process, the process posts the message to the send queue. The host channel adapter sends the message in the form of packets to the channel adapter having the receive queue. Each packet that is sent may include a packet sequence number. Logic associated with the receive queue ensures that packets are processed in a particular order using the packet sequence number.

Infiniband® supports operations such as remote direct memory access (RDMA) read and write operation. Specifically, a requested process may send a request in the message for the receiver to store data and/or return data. In response, the remote node's channel adapter includes functionality to store and/or return the requested data to the requesting process.

SUMMARY

In general, in one aspect, the invention relates to a method for processing commands on a host channel adapter. The method includes a host channel adapter receiving data in a command from a host connected to the host channel adapter. The command includes an instruction, identification of packet data, and a length field. The host channel adapter extracts a length of the command from the length field in the data, generates a scoreboard mask based on the length, where the scoreboard mask comprises unused bits in the scoreboard preset, and sets, with each portion of the data received, a bit in a scoreboard to identify the portion of data received. The host channel adapter further determines that the size of the data received for the command matches the length using the scoreboard by performing a bitwise "or" operation on the scoreboard and the scoreboard mask to obtain a result, and determining that all bits of the result are set. The host channel adapter further issues a kick on the host channel adapter when a size of the data received for the command matches the length, executes, in response to the kick, the instruction on a pipeline to initiate sending the packet data, and sends the packet data on a network.

In general, in one aspect, the invention relates to a host channel adapter that includes a physical collect buffer including a payload buffer configured to store a payload of a command, a header buffer configured to store a header of the command, a scoreboard field configured to store a scoreboard for tracking the portion of the command that is received, and a scoreboard mask field configured to store a scoreboard mask for masking bits of the scoreboard based on a length of the command. The host channel adapter further includes a collect buffer controller operatively connected to the physical collect buffer and configured to receive command data in a command from a host connected to the host channel adapter. The command includes an instruction, identification of packet data, and a length field. The collect buffer controller is further configured to extract the length of the command from the length field in the data, generate the scoreboard mask based on the length, store the command data in the physical collect buffer, set, with each portion of the command data received, a bit of the scoreboard to identify the portion of data received, and issue a kick on the host channel adapter when the scoreboard and the scoreboard mask indicate that all command data of the command is received.

In general, in one aspect, the invention relates to an integrated circuit that includes a physical collect buffer including a payload buffer and a header buffer. The integrated circuit further includes a collect buffer controller configured to receive data in a command from a host connected to the host channel adapter. The command includes an instruction, identification of packet data, and a length field. The collect buffer controller further includes functionality to extract a length of the command from the length field in the data, generate a scoreboard mask based on the length, wherein the scoreboard mask includes unused bits in the scoreboard preset, store the data in the physical collect buffer, and set, with each portion of the data received, a bit in a scoreboard to identify the portion of data received. The collect buffer controller further includes functionality to determine that the size of the data received for the command matches the length using the scoreboard by performing a bitwise "or" operation on the scoreboard and the scoreboard mask to obtain a result, and determining that all bits of the result are set. The collect buffer controller further includes functionality to issue a kick on the host channel adapter when a size of the data received for the command matches the length, where, in response to the kick, the instruction is executed and sent on the network.

Other aspects of the invention will be apparent from the following description and the appended claims.

BRIEF DESCRIPTION OF DRAWINGS

FIGS. 11A-11B show an example in one or more embodiments of the invention.

DETAILED DESCRIPTION

Figure 1:
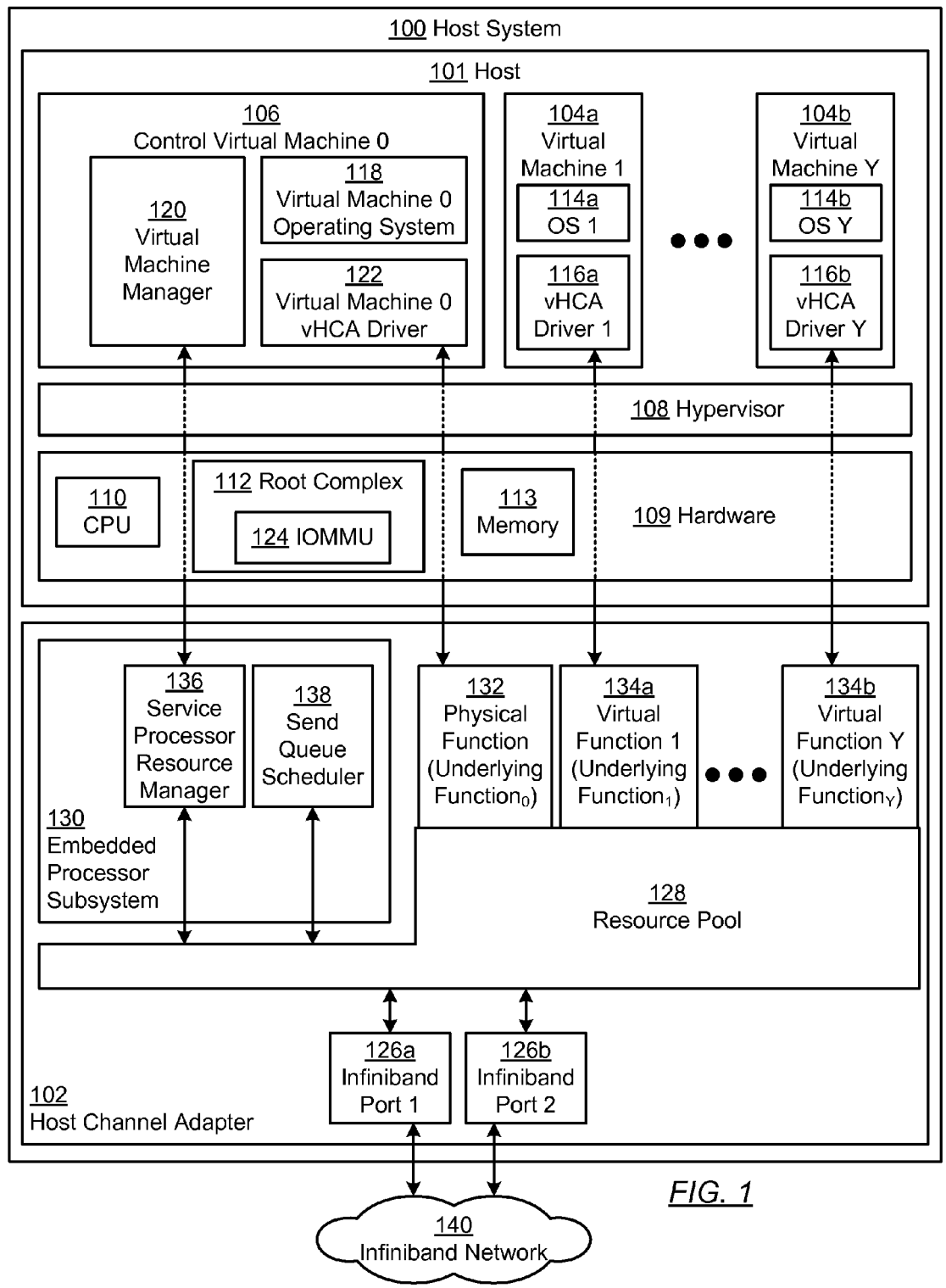
FIGS. 1-4 show schematic diagrams in one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for signaling to the host channel adapter when the entirety of a command is received. Specifically, embodiments of the invention use a length field in the command data that defines the length of the command. Thus, when command data is received from a host, the host channel adapter extracts the length, and generates a scoreboard mask based on the length. Subsequently, with each portion of the command data received, the host channel adapter sets a bit in a scoreboard that identifies the portion of the data received. The entire command is deemed received when performing a bitwise "or" operation on the scoreboard and the scoreboard mask to obtain a result having all bits set.

FIG. 1 shows a schematic diagram of a host system (100) in one or more embodiments of the invention. In one or more embodiments of the invention, the host system (100) is any physical computing device. Specifically, the host system (100) includes at least a minimum amount of hardware necessary to process instructions. As shown in FIG. 1, the host system (100) includes a host (101) and a host channel adapter (102) in one or more embodiments of the invention. These components are discussed below.

In one or more embodiments of the invention, the host (101) includes one or more guest virtual machines (e.g., virtual machine 1 (104a), virtual machine Y (104b)), a control virtual machine (106), a hypervisor (108), and a root complex (112). Each of these components is discussed below.

Broadly speaking, the virtual machines (e.g., virtual machine 1 (104a), virtual machine Y (104b), control virtual machine (106)) are distinct operating environments configured to inherit underlying functionality of the host operating system via an abstraction layer. In one or more embodiments of the invention, each virtual machine includes a separate instance of an operating system (e.g., OS 1 (114a), OS Y (114b)) (OS in FIG. 1). The separate instances of the operating system may be the same type of operating system or different types of operating systems.

Specifically, the guest virtual machine operating system (e.g., OS 1 (114a), OS Y (114b)) operates as if the guest virtual machine operating system is the only operating system on the host (101) and the resources (e.g., processor cycles, memory, resources of the host channel adapter) allocated to the guest virtual machine are the only resources available on the host (101). Thus, the guest virtual machine operating system (e.g., OS 1 (114a), OS Y (114b)) includes functionality to control the operating environment of applications executing in the guest virtual machine using resource allocated to the guest virtual machine Each virtual machine may be allocated disjoint or non-overlapping physical memory (113).

Many different types of virtual machines exist. For example, the Xen® virtualization project allows for multiple guest operating systems executing in a host operating system. Xen® is a trademark overseen by the Xen Project Advisory Board. In one embodiment of the invention, the host operating system supports virtual execution environments (not shown). Another example is a Solaris™ Container. In such cases, the Solaris™ Container may execute in the host operating system, which may be a Solaris™ operating system. Solaris™ is a trademark of Oracle America, Inc. In one embodiment of the invention, the host operating system may include both virtual machines and virtual execution environments.

In one or more embodiments of the invention, the guest virtual machine includes a virtual host channel adapter device driver (e.g., vHCA driver 1 (116a), vHCA driver Y (116b)). The virtual host channel adapter device driver is software program that provides an interface to host channel adapter (102) for the guest virtual machine operating system. Specifically, when the guest virtual machine operating system wants to send commands to the host channel adapter (102), the virtual machine operating system invokes a routine in the virtual host channel adapter device driver. In response, the virtual host channel adapter device driver issues commands to a virtualized device controller (not shown) presented by the hypervisor (108) (discussed below). In turn, the hypervisor (108) includes functionality to transmit the message to the host channel adapter (102).

In addition to the guest virtual machine (e.g., virtual machine 1 (104a), virtual machine Y (104b)), the host (101) also includes a control virtual machine (106). In one or more embodiments of the invention, the control virtual machine (106) has a separate address space and operating system environment than the guest virtual machine (e.g., virtual machine 1 (104a), virtual machine Y (104b)). The control virtual machine (106) includes a control virtual machine operating system (118), a control virtual machine manager (120), and a virtual machine host channel adapter device driver (122). The virtual machine host channel adapter device driver (122) includes functionality similar to the guest virtual machine host channel adapter device drivers (e.g., vHCA driver 1 (116a), vHCA driver Y (116b)) discussed above. The host virtual machine operating system (118) includes functionality to provide an operating environment for software executing in the control virtual machine (106).

In one or more embodiments of the invention, the software executing in the control virtual machine (106) includes a virtual machine manager (120) (discussed below). In one or more embodiments of the invention, the virtual machine manager (120) includes functionality to configure the hypervisor (108), configure the host channel adapter (102), create, remove, and configure guest virtual machines, and perform the management of the host (101). With regards to configuring the host channel adapter, the virtual machine manager includes functionality to send commands to the host channel adapter to adjust the number of resources allocated to each virtual machine To receive parameter values for performing the above management tasks, the virtual machine manager (120) may include a user interface and/or an application programming interface for communicating with a computer administrator or another program in one or more embodiments of the invention.

Continuing with FIG. 1, the hypervisor (108) includes functionality to control the sharing of hardware resources on the host (101). Specifically, the hypervisor (108) includes functionality to virtualize the physical devices of the host (101) so that more than one operating system may share the same physical device transparently in accordance with one or more embodiments of the invention. Further, the hypervisor (108) controls when the guest virtual machine (e.g., virtual machine 1 (104a), virtual machine Y (104b)) and the control virtual machine (106) are allowed to execute. For example, the hypervisor (108) may be a thin-privileged layer of software that only manages which guest virtual machine or the host virtual machine (106) is executing.

Continuing with the host, the host (101) includes hardware (109). The hardware (109) may include, for example, a central processing unit (110), memory (113), and a root complex (112). In one or more embodiments of the invention, the CPU (110) is a hardware processor component for processing instructions of the host. The CPU (110) may include multiple hardware processors. Alternatively or additionally, each hardware processor may include multiple processing cores. In general, the CPU (110) is any device configured to execute instructions on the host (101).

In one or more embodiments of the invention, the memory (113) is any type of hardware device for storage of data. In one or more embodiments of the invention, the memory (113) may be partitioned on a per-virtual machine basis, such that each virtual machine (e.g., control virtual machine (106), virtual machine 1 (104*a*), virtual machine Y (104*b*)) is allocated separate and distinct memory. In one or more embodiments of the invention, the memory (113) includes functionality to store a send queue (not shown).

A separate send queue may be stored in memory for each virtual machine Alternatively or additionally, multiple virtual machines may share one or more send queues. In one or more embodiments of the invention, a send queue includes functionality to store an ordered list of command identifiers for commands for processing by the host channel adapter (102). In one or more embodiments of the invention, the command identifiers may be the actual commands and/or references to the commands.

In one or more embodiments of the invention, the root complex (112) includes functionality to connect the CPU and memory subsystem to a peripheral component interconnect (PCI) Express switch fabric. Specifically, in one or more embodiments of the invention, the root complex (112) connects the host (101) to the host channel adapter (102). Although FIG. 1 shows the root complex (112) as separate from the CPU (110), the root complex (112) may be integrated as part of the CPU.

The root complex (112) includes an input/output memory management unit (IOMMU) (124) in one or more embodiments of the invention. The IOMMU (124) includes functionality to connect a direct memory access (DMA) input/output (I/O) bus to the memory. In one or more embodiments of the invention, the IOMMU (124) includes functionality to translate device virtual addresses to physical addresses of memory on the host (101).

Continuing with FIG. 1, the host (101) is connected to the host channel adapter (102). In one or more embodiments of the invention, the connection between the host (101) and the host channel adapter (102) may be a PCI express connection. Specifically, the host channel adapter may connect to a PCI express fabric connector on the host.

In one or more embodiments of the invention, the host channel adapter (102) is a hardware device configured to connect the host (101) to the Infiniband® network (140). Specifically, the host channel adapter (102) includes functionality to receive commands from the host (101) and process the commands. Processing the commands may include performing DMA with host memory to obtain and store packet data and to obtain control information, performing any validation required on the packet data, generating packets from the packet data, and sending and receiving packets on the Infiniband® network (140). FIG. 1 shows a schematic diagram of the host channel adapter (102) from the prospective of the host (101). As shown in FIG. 1, the host channel adapter (102) includes at least one Infiniband® port (e.g., Infiniband® port 1 (126*a*), Infiniband® port 2 (126*b*)), a resource pool (128), and an embedded processor subsystem (130). Each of the components of the host channel adapter is discussed below.

In one or more embodiments of the invention, an Infiniband® port (e.g., Infiniband® port 1 (126*a*), Infiniband® port 2 (126*b*)) is a physical interface connector between the host channel adapter (102) and the Infiniband® network (140). Although FIG. 1 shows two Infiniband® ports, more or fewer ports may exist without departing from the invention.

The resource pool (128) is a collection of resources that are required to send and receive packets on the Infiniband® network. Specifically, the resource pool (128) corresponds to the collection of hardware and stored data that is shared by the virtual machines (e.g., control virtual machine (106), virtual machine 1 (104*a*), virtual machine Y (104*b*)). The resource pool (128) is discussed in FIG. 2 below.

In one or more embodiments of the invention, the sharing of the resource pool is performed using the concepts of physical function and virtual functions. A physical function (132) exposes the actual hardware of the host channel adapter (102) to an operating system. Specifically, by way of the physical function, the control virtual machine operating system (118) may control the host channel adapter. Thus, the physical function allows the control virtual machine (106) to control the host channel adapter (102), such as to disable the host channel adapter (102).

A virtual function (e.g., virtual function 1 (134*a*), virtual function Y (134*b*)) exposes a virtualized host channel adapter to a virtual machine Specifically, the virtual function (e.g., virtual function 1 (134*a*), virtual function Y (134*b*)) exposes to the virtual machine operating system only the partition of the resource pool allocated to the virtual machine To the guest virtual machine (e.g., virtual machine 1 (104*a*), virtual machine Y (104*b*)), the resources exposed by the virtual function (e.g., virtual function 1 (134*a*), virtual function Y (134*b*)) appear as if the resource are the only resources on the host channel adapter (102). Thus, the virtual function (e.g., virtual function 1 (134*a*), virtual function Y (134*b*)) allows the virtual machine operating system (e.g., OS 1 (114*a*), OS Y (114*b*)) to control the portion of resources allocated to the virtual machine In other words, a virtual function (e.g., virtual function 1 (134*a*), virtual function Y (134*b*)) provides the virtual machine operating system (e.g., OS 1 (114*a*), OS Y (114*b*)) the appearance that the virtual machine operating system (e.g., OS 1 (114*a*), OS Y (114*b*)) is controlling the host channel adapter (102) as a whole even though the actions of the virtual machine operating system (e.g., OS 1 (114*a*), OS Y (114*b*)) does not affect any other virtual function (e.g., virtual function 1 (134*a*), virtual function Y (134*b*)).

In one or more embodiments of the invention, the term, underlying function (UF), is used to generically refer to either a physical function or a virtual function. Specifically, as used herein, an underlying function may be a physical function or a virtual function.

The embedded processor subsystem (130) corresponds to an embedded processor and logic for managing the host channel adapter (102). The embedded processor subsystem includes a service processor resource manager (136) and a send queue scheduler (138). The service processor resource manager (136) includes functionality to receive and process the management commands on the host channels adapter. For example, the management commands may be to change the allocation of host channel adapter resources, change the configuration of the host channel adapter, and perform other management of the host channel adapter. With regards to resource allocation, the service processor resource manager includes functionality to change the allocation of the host channel adapter resources to underlying functions and change the allocation of the host channel adapter resources to QoS levels within the underlying functions.

Continuing with FIG. 1, the send queue scheduler (138) includes functionality to schedule commands identified in the send queue on the host channel adapter. Specifically, the send queue scheduler includes functionality to iterate through the send queue and store commands identified in the send queue on the host channel adapter (102).

Figure 2:
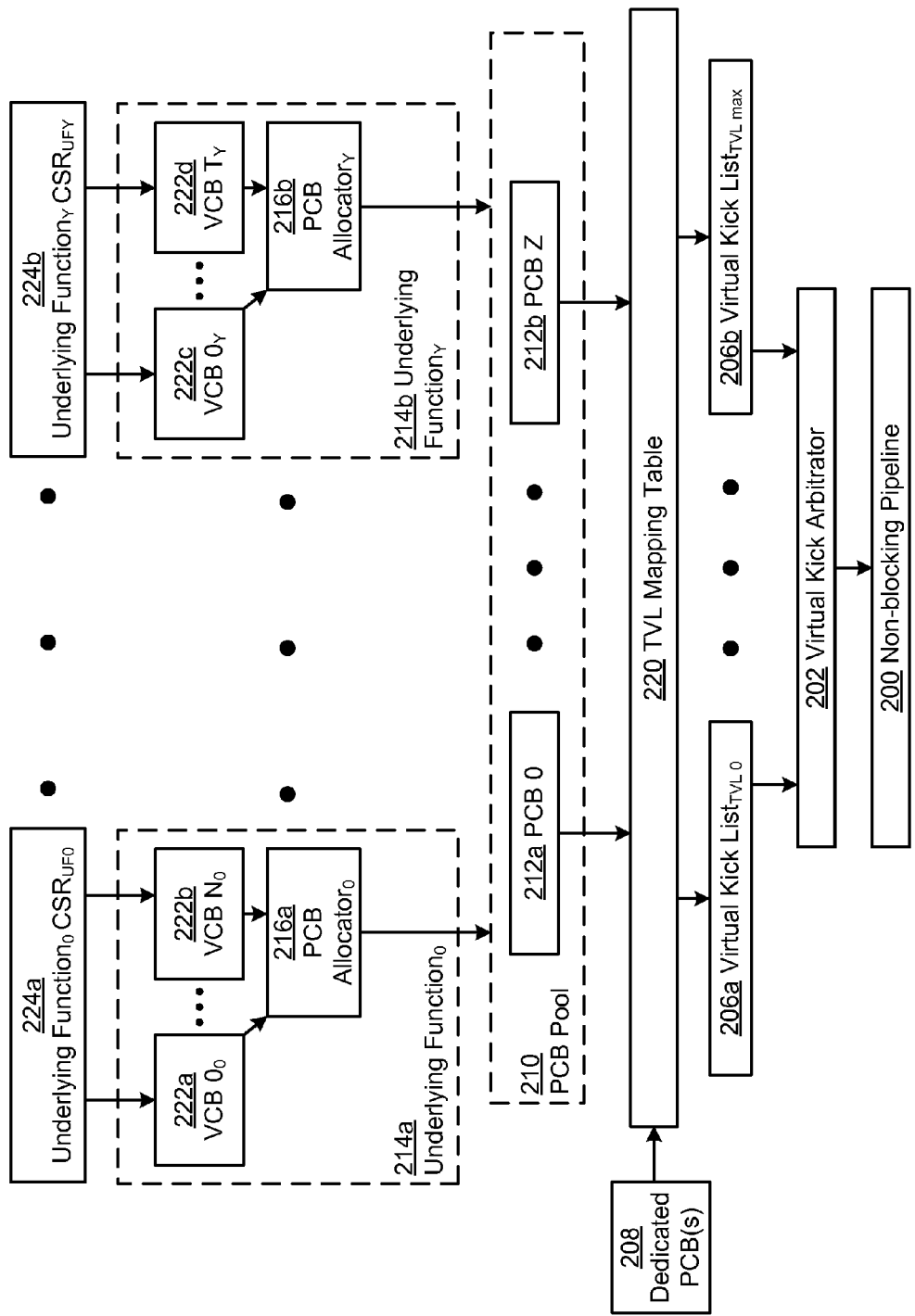

As discussed above, FIG. 1 provides a general diagram of the host channel adapter (102) in one or more embodiments of the invention. FIG. 2 shows a schematic diagram of the resources and management components for the resources of the host channel adapter in one or more embodiments of the invention. Specifically, FIG. 2 shows components of the resource pool for transmission of messages on the Infiniband® network as shared between virtual machines and components to manage the resource pool in one or more embodiments of the invention.

In general, the resource pool is configured to receive and execute commands from a virtual machine A command corresponds to an instruction to the host channel adapter. For example, a command may be an instruction to send a message on the Infiniband® network (not shown). A command includes command data in one or more embodiments of the invention. Specifically, command data corresponds to individual portions of the command.

When the command is an instruction to send a message on the Infiniband® network, the command may include the message itself or one or more addresses in the host memory having the message. The host channel adapter is configured to obtain the command, obtain the message from the command or from host memory referenced in the command, partition the message into packets if required, and send the packets on the Infiniband® network in accordance with an Infiniband® protocol. In one or more embodiments of the invention, the message is packet data. Specifically, packet data is data sent in the packets on the Infiniband® network. Thus, the packet data may be in the command or in the one or more addresses in host memory.

As shown in FIG. 2, the resource pool and management components of the host channel adapter include a non-blocking pipeline (200), a virtual kick arbitrator (202), transmit virtual lane (TVL) virtual kick lists (e.g., virtual kick list$_{TVL0}$ (206a), virtual kick list$_{TVLmax}$ (206b)), a mapping table (220), physical collect buffer (PCB) pool (210), dedicated PCBs (208), a PCB allocator (e.g., PCB Allocator$_0$(216a), PCB Allocator$_Y$(216b)), virtual collect buffers (VCBs) (e.g., VCB $0_0$ (222a), VCB N$_0$ (222b), VCB $0_Y$(222c), VCB T$_Y$(222d)), and underlying function CSRs (e.g., underlying function$_0$ CSR$_{UF0}$(224a), underlying function$_Y$CSR$_{UFY}$(224b)). Each of these components is discussed below.

The non-blocking pipeline (200) corresponds to a set of hardware and firmware that includes functionality to process commands on the host channel adapter. Specifically, the non-blocking pipeline (200) includes functionality to obtain a command from a PCB (described below), obtain packet data based on the command data, verify the queue pair for sending the packet data, generate one or more packets having the packet data, and sending the packets on the Infiniband® network in accordance with the Infiniband® protocol. In one or more embodiments of the invention, the non-blocking pipeline (200) is partitioned into modules (not shown). Each module corresponds to hardware and/or firmware that includes functionality to perform a portion of the nonblocking pipeline. For example, one module may be configured to perform DMA with the host memory while another module may be configured to generate packets having the packet data.

In one or more embodiments of the invention, one of the modules includes a completion module. A completion module includes functionality to store messages in a completion linked list queue until an acknowledgement is received or transmission is deemed to have failed, such as by not receiving an acknowledgement within a predefined period of time. In one or more embodiments of the invention, the completion module is used when a queue pair is set in reliable transmission mode.

In one or more embodiments of the invention, the non-blocking pipeline is time shared amongst TVLs. In particular, a TVL is a time slice of the non-blocking pipeline. In other words, commands assigned to a TVL may be blocked by the execution through the pipeline of one or more other commands in the same TVL. In contrast to commands assigned to the same TVL, when a command is assigned to a different TVL, the command is not blocked by other commands in different TVLs.

In one or more embodiments of the invention, each TVL is associated with a virtual kick list (e.g., virtual kick list$_{TVL\ 0}$ (206a), virtual kick list$_{TVL\ max}$ (206b)). A virtual kick list (e.g., virtual kick list$_{TVL\ 0}$ (206a), virtual kick list$_{TVL\ max}$ (206b)) corresponds to a storage location for storing command identifiers of commands, assigned to the TVL, for which a kick has issued. A kick indicates that the command is ready for execution on the non-blocking pipeline (200). Specifically, in one or more embodiments of the invention, the kick indicates that the entirety of the command is stored on the host channel adapter. In one or more embodiments of the invention, commands are processed from the virtual kick list in a first in first out (FIFO) order. In other words, the commands are processed in an order in which the commands are received.

In one or more embodiments of the invention, the command identifier of the command may be the command, an address of a memory location having the command, or any other data that identifies the command. For example, the command identifier may be an address or identifier of the PCB (discussed below) having the command.

In one or more embodiments of the invention, a virtual kick arbitrator (202) is operatively interposed between the virtual kick list (e.g., virtual kick list$_{TVL0}$ (206a), virtual kick list$_{TVLmax}$ (206b)) and the non-blocking pipeline (200). In one or more embodiments of the invention, the virtual kick arbitrator includes functionality to arbitrate between TVLs having commands initiating execution on the pipeline. Specifically, the virtual kick arbitrator includes functionality to select a TVL and initiate execution of the command from the virtual kick list for the TVL.

Continuing with FIG. 2, the host channel adapter includes PCBs (e.g., dedicated PCBs (208), PCB 0 (212a), PCB Z (212b)). A PCB is physical memory that is configured to store a single command. Further, each command requires a single PCB in one or more embodiments of the invention.

Dedicated PCBs correspond to PCBs that are dedicated for use by administrator and management components in one or more embodiments of the invention. For example, dedicated PCBs may be used by the service processor resource manager, the send queue scheduler, a host process for controlling the host channel adapter, and for other such components of the system.

In one or more embodiments of the invention, the host channel adapter includes a PCB pool (210). A PCB pool (210) corresponds to a collection of PCBs (e.g., PCB 0 (212a), PCB Z (212b)) that are available for use by any underlying function. Specifically, each PCB (e.g., PCB 0 (212a), PCB Z (212b)) in the PCB pool (210) may used by any underlying function in one or more embodiments of the invention. When a PCB is in use by an underlying function (e.g., Underlying Function$_0$ (214a), Underlying Function (214b)) to store a command, the PCB is considered bound to the underlying function and cannot be used by another underlying function. The PCB is discussed in further detail below and in FIG. 4.

Continuing with FIG. 2, a TVL mapping table is operatively interposed between the PCBs (e.g., dedicated PCBs (208), PCB 0 (212a), PCB Z (212b)) and the virtual kick list (e.g., virtual kick list$_{TVL0}$ (206a), virtual kick list$_{TVLmax}$ (206b)) in one or more embodiments of the invention. The TVL mapping table (220) includes a mapping of the underlying function (e.g., Underlying Function$_0$ (214a), Underlying Function$_Y$ (214b)) to one or more TVLs. In particular, the mapping defines, for each underlying function, which TVLs correspond to the underlying function. Specifically, each underlying function may be allocated a set of TVLs. In one or more embodiments of the invention, the mapping of set of TVLs may be storage of an identifier of the underlying function with an identifier of the virtual kick lists corresponding to the TVLs in the set of TVLs.

Additionally, in one or more embodiments of the invention, a set of TVLs may be allocated to the dedicated PCBs (208). Thus, the TVL mapping table (220) may further include a mapping of the dedicated PCBs to the set of TVLs allocated to the dedicated PCBs.

Continuing with FIG. 2, the PCB pool (210) is connected to one or more PCB allocators. A PCB allocator is logic, such as hardware or firmware, configured to select the PCB from the PCB pool (210) for storing a command. Although FIG. 2 shows multiple PCB allocators, a single PCB allocator may exist for all underlying functions. Alternatively or additionally, a separate PCB allocator may exist for each PCB. The PCB allocator is discussed in further detail below and in FIG. 4.

In one or more embodiments of the invention, the PCB allocator further includes functionality to bind the PCB to a VCB (VCB) (e.g., VCB 0$_0$ (222a), VCB N$_0$ (222b), VCB 0$_Y$ (222c), VCB T$_Y$ (222d)). In one or more embodiments of the invention, a VCB is a virtual address space used by a process on the host to write to a PCB. Specifically, a single VCB is capable of being bound to only a single PCB at any single moment in time in one or more embodiments of the invention. Thus, the binding a PCB to a VCB creates an association between the VCB and the PCB. In other words, the binding prevents the PCB from being used by any other VCB and prevents the VCB from being associated with any other PCB.

In one or more embodiments of the invention, an underlying function CSR (e.g., CSR$_{UF\ 0}$ (224a), CSR$_{UF\ Y}$ (224b)) stores status and control information about the VCBs allocated to the underlying function. Specifically, each underlying function is allocated a set of VCBs from a VCB pool (discussed below and in FIG. 3). The number of VCBs allocated to an underlying function represents a guarantee of the number of commands that the HCA will process for the virtual machine corresponding to the underlying function. In one or more embodiments of the invention, the number of VCBs allocated to an underlying function may exceed the number of PCBs allocated to the underlying function. The flowcharts of FIGS. 6 and 7, discussed below, provide a method for processing requests when the underlying function has a VCB available and no PCBs available.

Continuing with FIG. 2, in one or more embodiments of the invention, the underlying function CSR (e.g., CSR$_{UF\ 0}$ (224a), CSR$_{UF\ Y}$ (224b)) may include a base address register (BAR). The BAR stores the lowest virtual address assigned to the underlying function in one or more embodiments of the invention. The underlying function CSR may further store information about which VCBs are in use in one or more embodiments of the invention.

Figure 3:
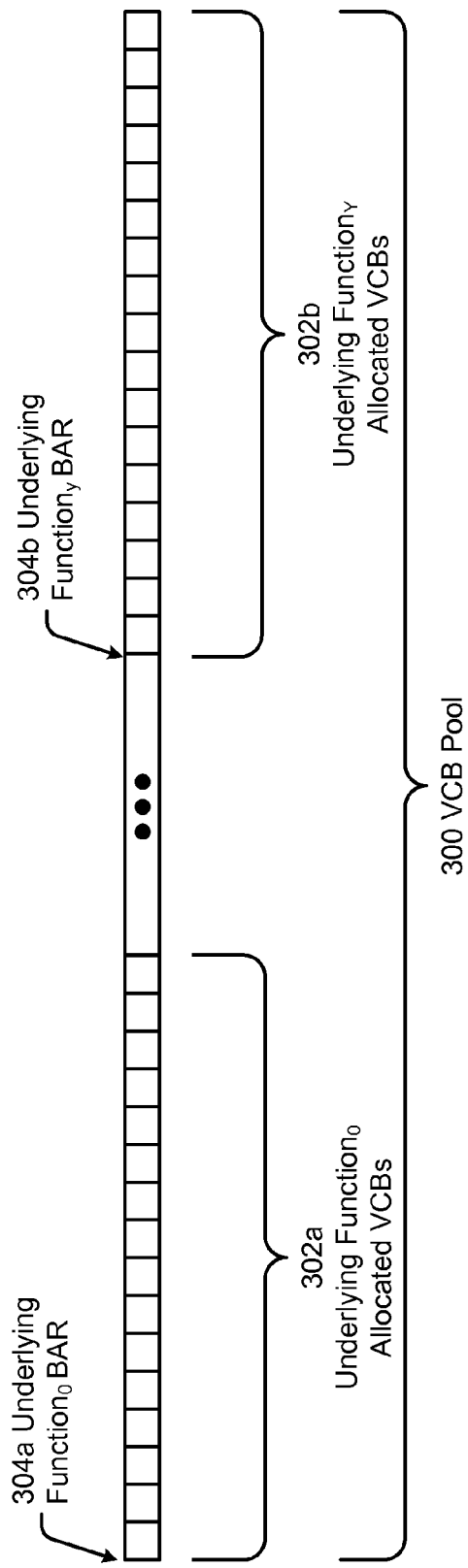

FIG. 3 shows a schematic diagram of a VCB pool (300) in one or more embodiments of the invention. In one or more embodiments of the invention, the VCB pool is an address space partitioned into VCBs (each VCB is shown as a square block in FIG. 3). As shown in FIG. 3, each underlying function may be allocated a set of VCBs (e.g., UF$_0$ allocated VCBs (302a), UF$_Y$ allocated VCBs (302b)). The number of VCBs allocated to each underlying function may or may not be the same as the number of VCBs allocated to different underlying functions. The underlying function BAR (e.g., UF$_0$ BAR (304a), UF$_Y$ BAR (304b)) stores the address of the first VCB allocated to the underlying function in one or more embodiments of the invention.

Figure 4:
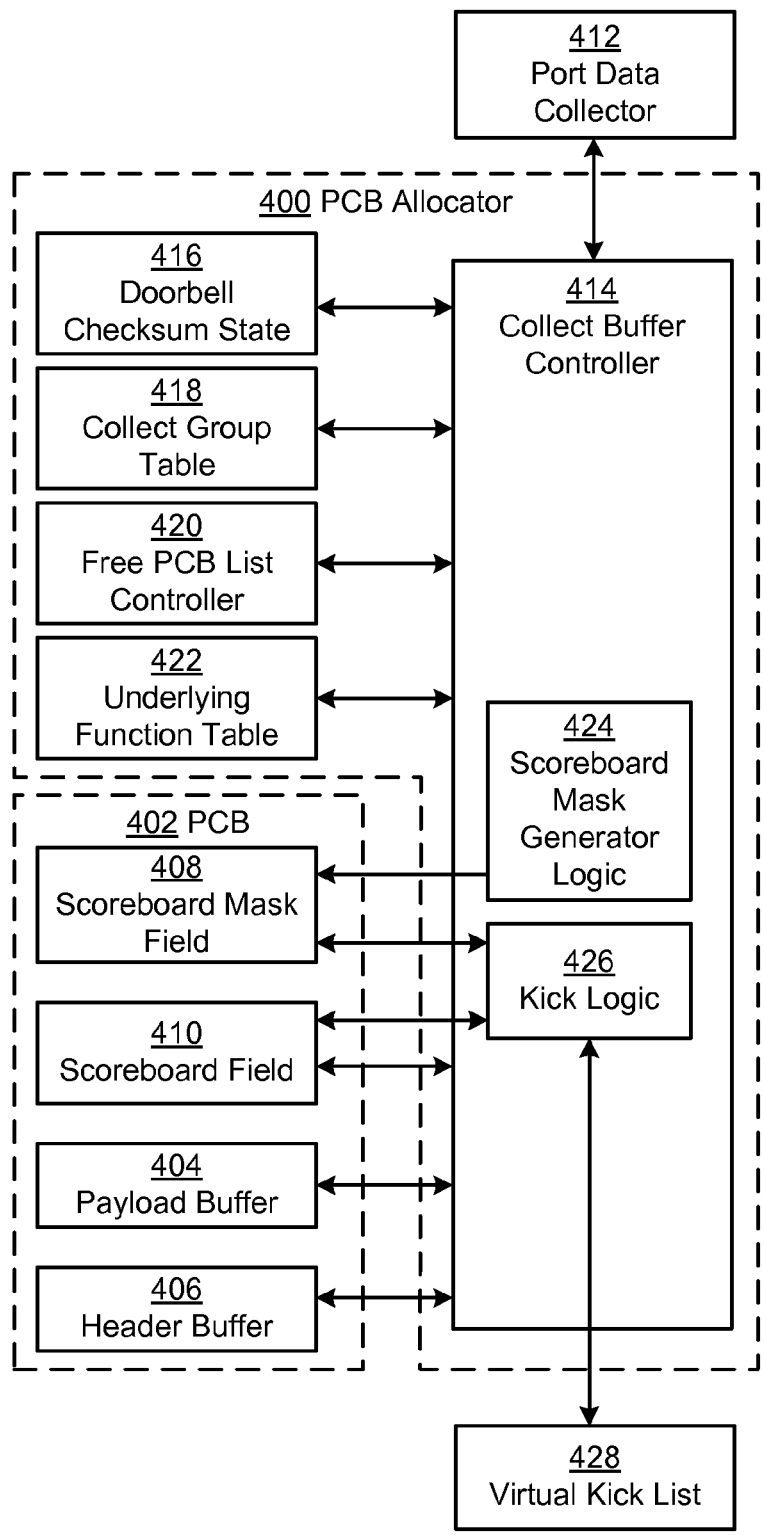

FIG. 4 shows a schematic diagram of the PCB allocator (400) in one or more embodiments of the invention. In one or more embodiments of the invention, all or a portion of the components of FIG. 4 are located on an integrated circuit. FIG. 4 shows the components of and connecting to the PCB allocator (400) and the PCB (402) in one or more embodiments of the invention.

As shown in FIG. 4, the PCB allocator (400) is connected to a PCB (e.g., PCB (402)). In one or more embodiments of the invention, each PCB (e.g., PCB (402)) includes a payload buffer (404), a header buffer (406), a scoreboard mask field (408), and a scoreboard field (410). Each of these components is described below.

In one or more embodiments of the invention, the payload buffer (404) corresponds to storage for storing the payload of the command. Specifically, the command may include packet data to send on the Infiniband® network or may include one or more addresses in memory on the host that include the packet data. In one or more embodiments of the invention, if the command includes packet data, the packet data is stored as payload in the payload buffer (404).

In one or more embodiments of the invention, the header buffer (406) corresponds to storage for storing the header of the command. The header of the command includes data for processing by the host channel adapter. For example, the header may include the type of command, one or more addresses in memory on the host that includes packet data, a queue pair identifier, a length of the command, and/or any other information for processing by the host channel adapter.

The scoreboard mask field (408) and the scoreboard field (410) each include functionality to store a scoreboard mask and a scoreboard, respectively. The scoreboard mask and the scoreboard may each be represented as a bit string (i.e., an ordered series of bits), where each bit in the bit string corresponds to a location of command data in relation to the VCB. Specifically, in one or more embodiments of the invention, the VCB is a virtual page. The virtual page is the same size as the PCB in one or more embodiments of the invention. Thus, each bit in the scoreboard mask (408) represents a specific segment of the virtual page, and, therefore, a specific segment of the PCB. In one or more embodiments of the invention, the segments of the PCB are non-overlapping and together form the entire PCB. In one or more embodiments of the invention, the size of the scoreboard mask field (408) and the scoreboard field (410) and, therefore, the number of bits in the bit string, is at least as many as the number of bits to represent each segment of the PCB.

In one or more embodiments of the invention, the scoreboard is used to track which segment of command data is received. Specifically, in one or more embodiments of the invention, each bit in the scoreboard may initially be reset (defined below). As command data is received, the bit in the position corresponding to the segment of the received command data is set.

In one or more embodiments of the invention, for a particular command, the scoreboard mask is configured to have bits that represent segments of the PCB that will not be used for a particular command set. The bits that represent segments of the PCB that will not be used for a particular command set may be referred to herein as unused bits. In other words, for a particular command, the unused bits are set based on the PCB being greater than the size of the particular command. In one or more embodiments of the invention, the unused bits may be set immediately after a length value is received and used to update the scoreboard before being reset for the next command data received. Alternatively, the unused bits may be continually set after the length value is received until kick is issued.

In one or more embodiments of the invention, a bit is set when the value of the bit is changed to indicate that command data is received for the corresponding segment. A bit is reset when the value of the bit changes from indicating command data is received for the corresponding segment to indicating command data is not received for the corresponding segment. A bit is not set when the value of the bit indicates that command data is not received for the corresponding segment. A bit is preset when the value of the bit is initialized to indicate command data is received for the corresponding segment.

For example, in binary terms, a value of "1" may indicate that command data is received for the corresponding segment. In the example, a bit is set when the value of the bit is changed to "1", reset when the value of the bit changes from "1" to "0", not set when the value of the bit is "0", and preset when the value of the bit is initialized to "1". As an alternative example in binary terms, the value of "1" may indicate that command data is not received for the corresponding segment. In the alternative example, a bit is set when the value of the bit is changed to "0", reset when the value of the bit changes from "0" to "1", not set when the value of the bit is "1", and preset when the value of the bit is initialized to "0".

Continuing with the PCB (402), consider the following example. Consider the scenario in which the payload buffer is 256 bytes (B) and the header buffer is 64 B. In the example, the scoreboard field and scoreboard mask field may each be 40 bits. Each bit in the scoreboard represents a separate and distinct 8 B of the 320 B command. Similarly, each bit in the scoreboard mask field represents a separate and distinct 8 B of the 320 B command. Thus, the first 8 bits of each of the scoreboard and scoreboard mask may represent 8 B of the header. The remaining 32 bits of the scoreboard and the scoreboard may represent 8 B of the payload. In the example, consider the scenario in which a command has a 64 B header and only a 128 B payload. In the example, consider the scenario in which the length is the first command data received. In the example, the scoreboard mask is updated to have the first eight bits not set for the header, the next 16 bits not set for the payload, and the remaining bits set in one or more embodiments of the invention (e.g., scoreboard mask="0000 0000 0000 0000 0000 0000 1111 1111"). Continuing with the example, the scoreboard may be updated using the scoreboard mask (e.g., scoreboard="0000 0000 0000 0000 0000 0000 1111 1111" after the length is received). When the first 8 B of the header is received, the scoreboard has the first bit set (e.g., scoreboard="1000 0000 0000 0000 0000 0000 1111 1111"). When the second 8 B of the header is received, the scoreboard has the first two bits set (e.g., scoreboard="1100 0000 0000 0000 0000 0000 1111 1111"). As shown, with each portion of command data received regardless of order, the scoreboard is updated to reflect the portion of command data received. When the scoreboard completely set, then a virtual kick is issued.

Continuing with FIG. 4, the PCB allocator (400) is connected to a port data collector (412). In one or more embodiments of the invention, the port data collector (412) is a hardware port configured to receive command data from a transmission medium that connects the host to the host channel adapter. In one or more embodiments of the invention, the transmission medium is a PCI express fabric bus (not shown). The port data collector includes functionality to transmit the command data to a collect buffer controller (414) (discussed below).

In one or more embodiments of the invention, the port data collector (400) is operatively connected to the PCB allocator (400). The PCB allocator includes a collect buffer controller (414), a doorbell checksum state (416), a collect group table (418), a free PCB list controller (420), and an underlying function table (422). In one or more embodiments of the invention, the collect buffer controller (414) corresponds to hardware and/or firmware. The collect buffer controller (414) includes functionality to receive command data from the port data collector (412), select a PCB (e.g., PCB (402)) from the PCB pool to process the command, update the scoreboard field (410), and trigger a virtual kick when the entirety of the command data is received.

In one or more embodiments of the invention, the collect buffer controller (414) includes a scoreboard mask generator logic (424) and kick logic (426). The scoreboard mask generator logic (424) includes functionality to identify the length field in the command data, extract a length value from the length field, and generate the scoreboard mask based on the length value.

In one or more embodiments of the invention, kick logic (426) include functionality to determine whether the entire command is received, and issue a kick when the entire command is received. The kick logic (426) is operatively connected to the scoreboard field (410), the scoreboard mask field (408), and the virtual kick list (428) (discussed above and in FIG. 2).

Continuing with the PCB allocator (400), the doorbell checksum state (416) corresponds to a block that stores a checksum of the contents of the payload buffer and the header buffer. In one or more embodiments of the invention, the checksum is a one's complement of the sum of the header and the payload. However, other types of checksums may be used without departing from the scope of the invention.

In one or more embodiments of the invention, the collect group table (418) maintains a counter for each collect group. The counter denotes the number of PCBs available to each collect group. In one or more embodiments of the invention, a collect group corresponds to an underlying function, a quality of service level with the underlying function, or grouping of entities. In one or more embodiments of the invention, when writing to a PCB is initiated, the counter corresponding to the collect group may be decremented.

In one or more embodiments of the invention, the free PCB list controller (420) corresponds to logic and storage for storing a free PCB list identifying PCB(s) that are not currently in use. Different structures may be used for the free PCB list. For example, in one or more embodiments of the invention, the free PCB list is a bit string. Each bit in the free PCB list represents a particular PCB. When the bit corresponding to the PCB is set, then the PCB may be deemed available. Another structure may be for the free PCB list to store a unique identifier of each PCB that is available. When the unique identifier is removed from the free PCB list, then the PCB may be deemed to be no longer available.

In one or more embodiments of the invention, the underlying function table (422) corresponds to storage for storing information about the VCBs allocated to each underlying function. Specifically, the underlying function table identifies the virtual address space corresponding to each underlying function in one or more embodiments of the invention.

Although FIGS. 1-4 show a certain configuration of components, other configurations may be used without departing from the invention. For example, rather than having a PCB pool from which any underlying function may use, individual PCB may be allocated to a particular underlying function to be used solely for the particular underlying function. Other variations of the system may be used without departing from the invention.

Figure 5:
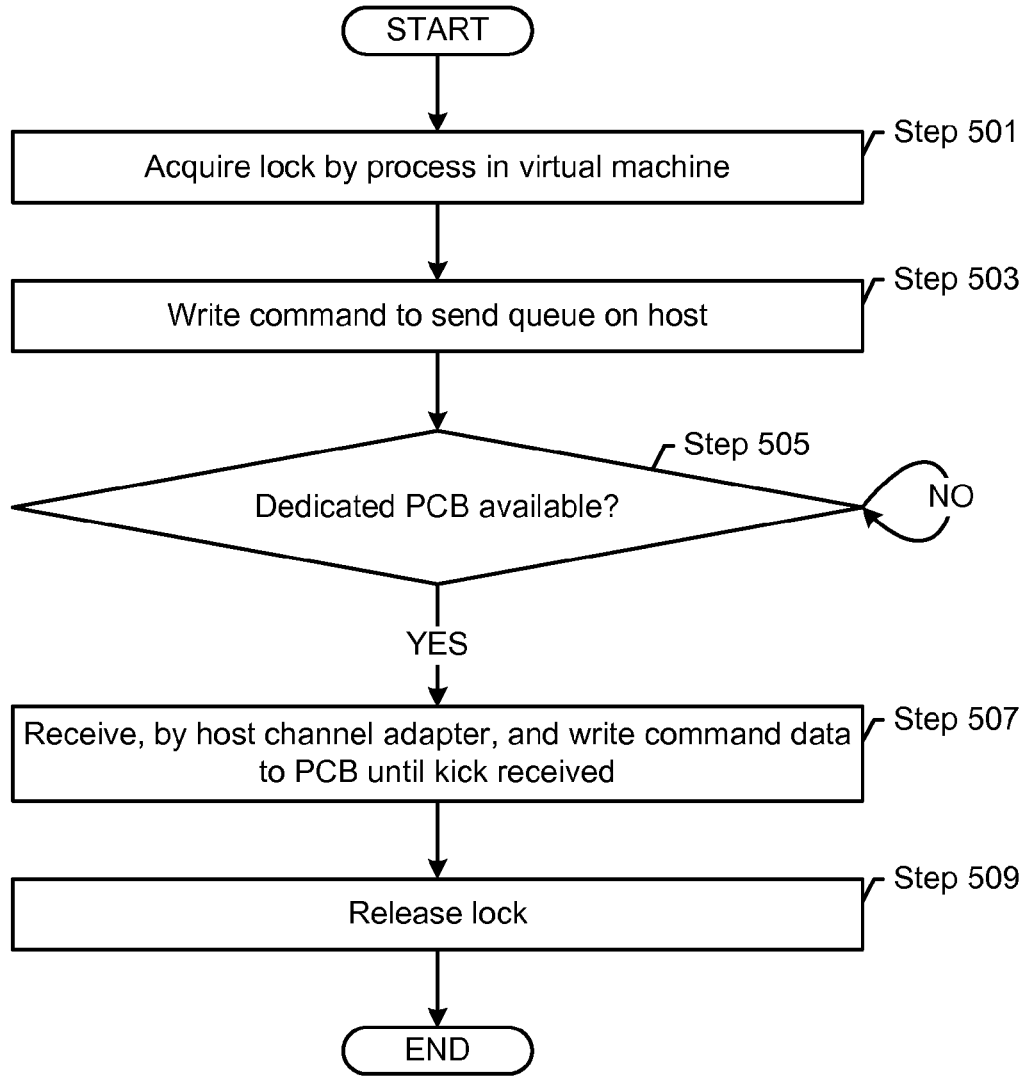
FIGS. 5-10 show flowcharts in one or more embodiments of the invention.

FIGS. 5-10 show flowcharts for processing commands in one or more embodiments of the invention. FIG. 5 shows a flowchart for using the dedicated PCBs by a process in a virtual machine in one or more embodiments of the invention.

In Step 501, a process executing in a virtual machine acquires a lock to the dedicated PCB. In one or more embodiments of the invention, the lock is located on the host channel adapter. In Step 503, the process executing in the virtual machine writes a command to the send queue on the host. In one or more embodiments of the invention, the writing of the command to the send queue may be performed by acquiring a separate lock corresponding to the memory location of physical memory having the send queue and storing the command in the memory location.

Continuing with FIG. 5, in Step 505, the virtual machine determines whether a dedicated PCB is available. In one or more embodiments of the invention, determining whether a dedicated PCB is available may be performed by checking a CSR that indicates whether the corresponding dedicated PCB is in use. In one or more embodiments of the invention, the CSR may be set and checked by both hosts processes and the embedded processor subsystem.

In Step 507, when the dedicated PCB is available, the host channel adapter receives command data (i.e., data in the command) and writes the command data to the PCB until the kick is received. Specifically, in one or more embodiments of the invention, the command data may be transmitted to the host channel adapter using the PCI express fabric. Each command may be of variable length. The kick indicates that the entirety of the command is stored in the PCB. Performing Step 507 is discussed below and in FIG. 9. Continuing with FIG. 5, in Step 509, the lock is released in one or more embodiments of the invention.

Although FIG. 5 shows a flowchart for a process on the host to use the dedicated PCB, in one or more embodiments of the invention, dedicated PCBs may be used by the virtual machine manager, the send queue scheduler, portions of the electronic processor subsystem, and other components to perform management functions.

Figure 6:
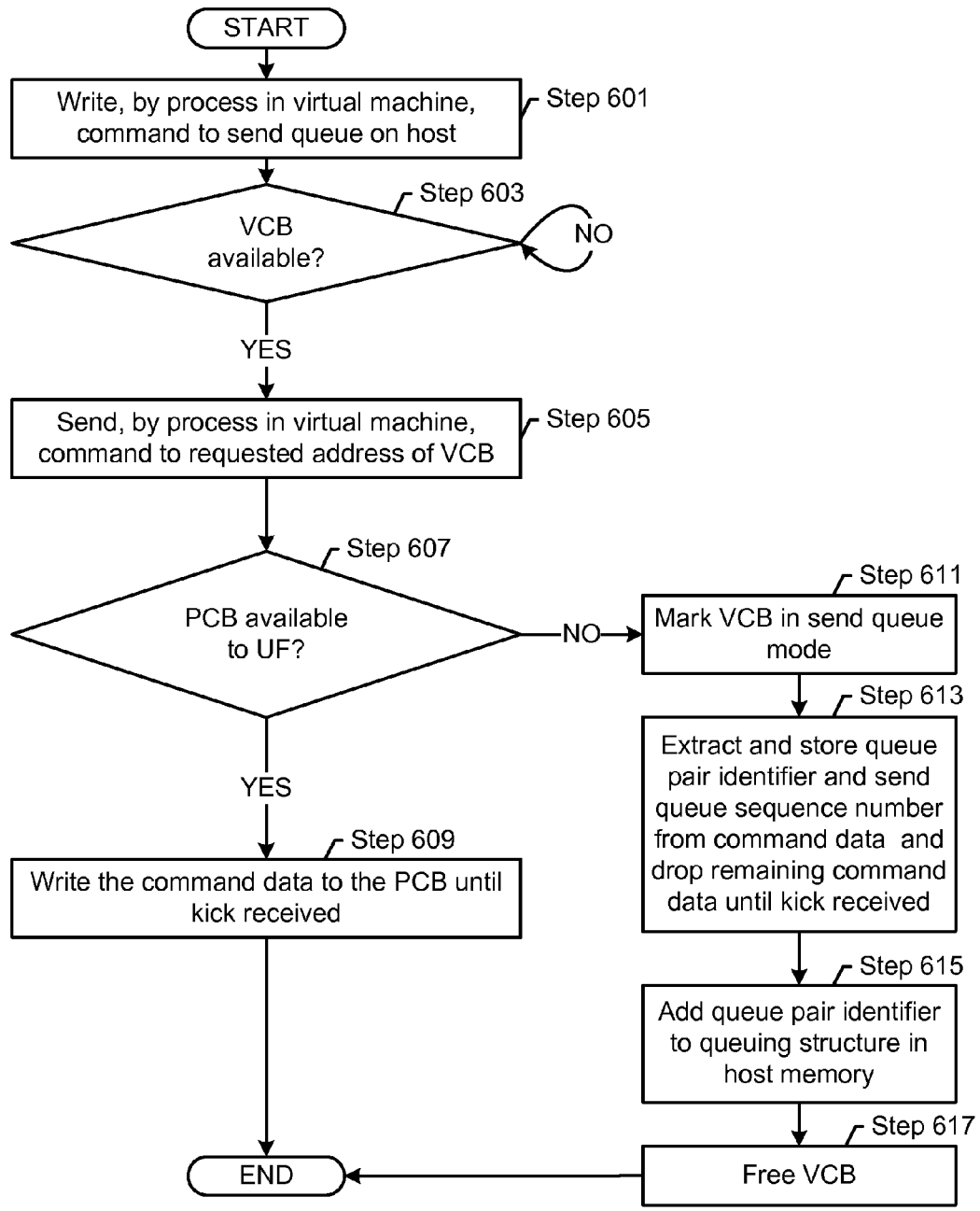

FIG. 6 shows a flowchart for a virtual machine (e.g., control virtual machine, guest virtual machine) to send a command to the host channel adapter using VCBs. In Step 601, a process in the virtual machine writes the command to the send queue on the host. As discussed above, to write the command to the send queue, the process may acquire a lock for the send queue.

In Step 603, a determination is made about whether a VCB is available. Management of the usage of the VCBs is performed by the virtual machine operating system in one or more embodiments of the invention. Specifically, the virtual machine operating system allocates the VCBs to the process in the virtual machine requesting the VCB. The process selects the VCB to allocate from the set of VCBs allocated to the process. If a VCB is not available, then the process waits.

When a VCB is available, the process in the virtual machine sends a command to the requested address of the VCB in Step 605. At this stage, once the command is sent to the VCB, to the process, the command is processed by the host channel adapter. However, the physical resources may not be available on the host channel adapter.

In Step 607 a determination is made about whether a PCB is available to the underlying function. Specifically, when command data corresponding to a new command is received, the PCB allocator determines, based on the VCB address, whether a PCB is available. For example, the PCB allocator may first check whether a PCB corresponding to the underlying function is available. If a PCB corresponding to the underlying function is not available, then the PCB allocator may check whether a PCB shared amongst the underlying functions is available. Checking whether a PCB is available may be performed by checking a CSR to determine whether the maximum allocated number of PCBs is in use.

In Step 609, if a PCB is available, then PCB is bound to the VCB and the command data is written to the PCB. In one or more embodiments of the invention, the binding means that any subsequent command data written to the VCB for the command is stored in the PCB bound to the VCB. Writing command data until the kick is received may be performed as discussed above with reference to Step 507 in FIG. 5.

Continuing with FIG. 6, if a PCB is not available, then the VCB is marked to be in send queue mode in Step 611. By marking the VCB in send queue mode, the command is set to be later obtained from the send queue.

In Step 613, the queue pair identifier and the send queue sequence number is extracted from the command data and the remaining command data is dropped until the kick is received. In one or more embodiments of the invention, the queue pair identifier corresponds to the queue pair to which the command is directed. The send queue sequence number provides an identifier of where the command was stored in the send queue in Step 601 (discussed above).

As discussed above, the non-existence of a PCB may be hidden from the process in the virtual machine Accordingly, the process of the virtual machine may send command data for the entire command to the host channel adapter. However, as discussed above, the remaining command data is dropped in one or more embodiments of the invention.

In Step 615, the queue pair identifier and the send queue sequence number is added to the queuing structure in host memory. By adding the queue pair identifier and the send queue sequence number to the queuing structure, the command may be obtained by the send queue scheduler and stored on the host channel adapter. In Step 617, once the kick is received, the VCB is freed. At this stage, the VCB may be used by other processes in the virtual machine.

Figure 7:
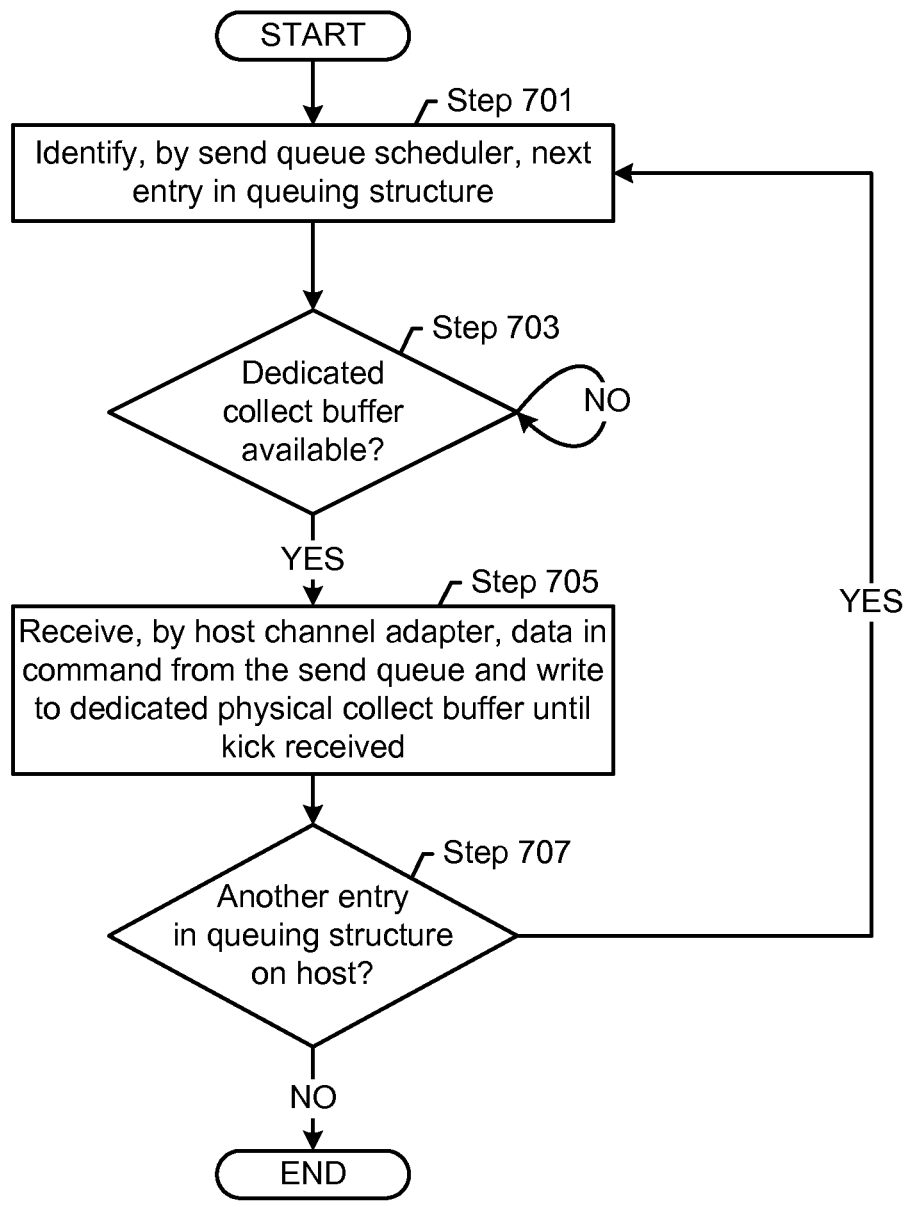

FIG. 7 shows a flowchart for the send queue scheduler to store commands on the host channel adapter in one or more embodiments of the invention. In one or more embodiments of the invention, the send queue scheduler stores commands on the host channel adapter for a process in a virtual machine when a PCB is unavailable to the process in the virtual machine as discussed above and in FIG. 5. Thus, the operations of and the resources used by the send queue scheduler is shared between processes in different virtual machines.

In Step 701, the send queue scheduler identifies the next entry in the queuing structure. In one or more embodiments of the invention, the queuing structure is a first in first out queue.

In such embodiments, the next entry in the queuing structure is the oldest entry in the queuing structure.

In Step 703, the send queue scheduler determines whether a dedicated PCB is available. Determining whether a dedicated PCB is available may be performed as discussed above with reference to Step 505 of FIG. 5.

When a dedicated PCB is available, the send queue scheduler obtains the send queue sequence number and the queue pair identifier in the queuing structure. The scheduler requests the command from the send queue location corresponding to the send queue sequence number using the queue pair identifier. When the scheduler requests the command, the command data is transferred to the host channel adapter.

In Step 705, the host channel adapter receives the command data from the send queue and writes the data to the dedicated PCB until the kick is received. Step 705 may be performed in a similar manner as discussed above with reference to Step 507 in FIG. 5.

In Step 707, a determination is made about whether another entry in the queuing structure on the host exists. If another entry exists, then the send queue scheduler continues FIG. 7 to process the next entry in the queuing structure.

Figure 8:
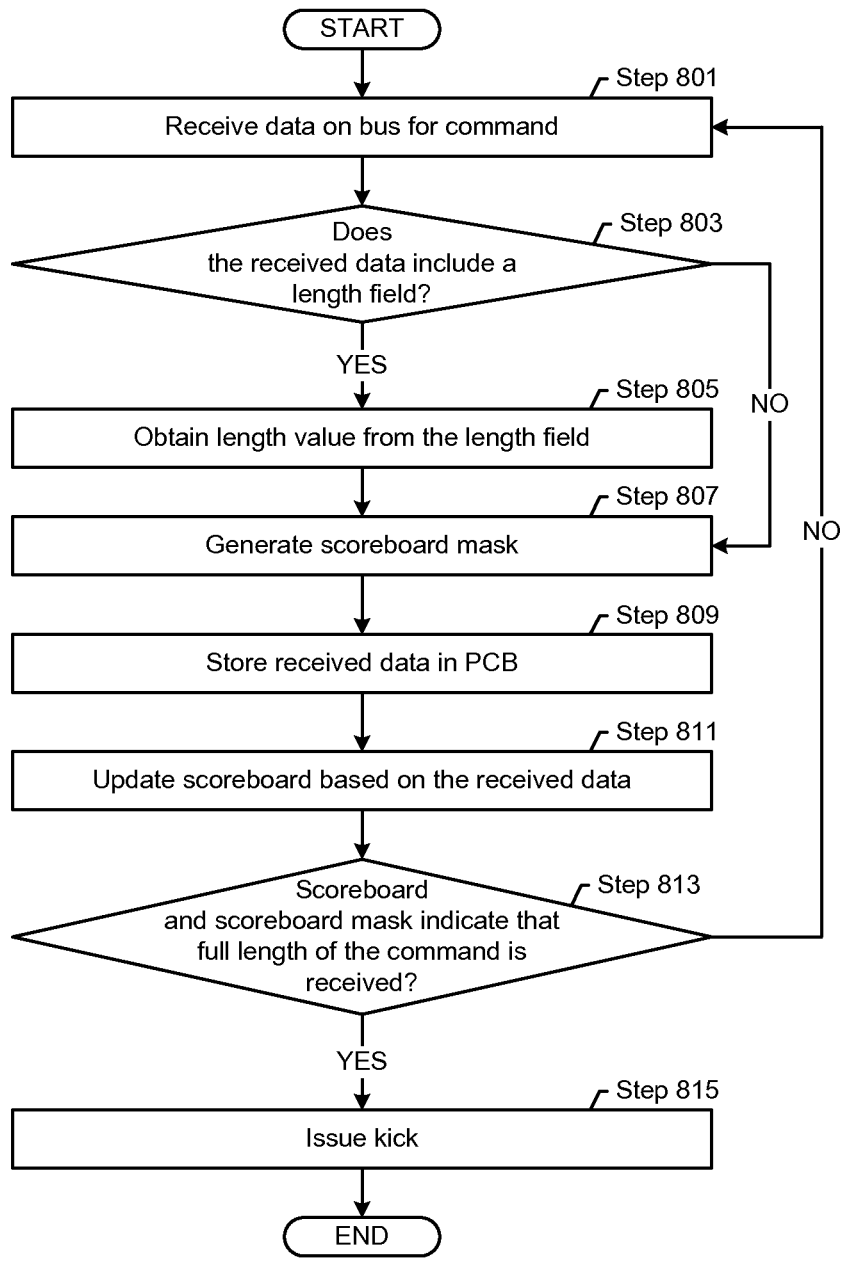

FIG. 8 shows a flowchart for receiving command data and generating a kick in one or more embodiments of the invention. In one or more embodiments of the invention, prior to setting a bit in the scoreboard when a new command is received, the scoreboard and the scoreboard mask is reset. In Step 801, command data is received on the PCI express fabric bus. In one or more embodiments of the invention, the command data received is in conformance with a predefined protocol. For example, the predefined protocol may set the position of the address, the type of command, and the length field as well as remaining data in the command. The length field may be defined according to the predefined protocol as being at a particular portion of the command, such as starting at a particular bit location, or otherwise being specified by the predefined protocol.

In Step 803, a determination is made about whether the received command data includes a length field. Determining whether the received command data includes the length field may be performed using the predefined protocol. In Step 805, if the received command data includes a length field, the length value is obtained from the length field. At this stage, the host channel adapter has information regarding the size of the command.

In Step 807, regardless of whether the command data includes a length field, a scoreboard mask is generated. If the scoreboard mask includes a length field, generating the scoreboard mask includes identifying, from the length value, the length of the header and the length of the payload. In one or more embodiments of the invention, from the length of the header, the used and unused segments of the header are identified. A used segment is one which will store command data for the command while and unused segment is one which will not store command data for the command. The bits of the scoreboard mask corresponding to the used segment(s) of the header are not set while the bits corresponding to the unused segment(s) of the header are set. Similarly, in one or more embodiments of the invention, from the length of the payload, the used and unused segments of the payload are identified. The bits of the scoreboard mask corresponding to the used segment(s) of the payload are not set while the bits corresponding to the unused segment(s) of the payload are set.

Continuing with Step 807, if the command data includes data for storage in the PCB, then bits corresponding to the segments are set in the scoreboard mask. Specifically, an address of the command data is identified. Based on the address of the command data, the segment of the header buffer or the payload buffer being populated is identified. In one or more embodiments of the invention, because a page of the VCB corresponds to a page of the PCB, only the offset of the address is used to identify the segment. The bit(s) in the scoreboard mask corresponding to the identified segment is set in one or more embodiments of the invention. In such embodiments, the scoreboard mask not only masks the unused bits, but also masks the bits corresponding to the received command data that is stored in the PCB.

In Step 809, the received command data is stored in the PCB. The received command data is stored in the PCB bound to the VCB to which the command data is addressed. In one or more embodiments of the invention, the received command data may be stored with or without the length field.

In Step 811, a determination is made about whether the scoreboard and the scoreboard mask indicate that the full length of the command is received. In one or more embodiments of the invention, a bitwise "OR" operation is on the scoreboard and the scoreboard mask to obtain a result. If the result has all of bits set, then the full length of the command is determined to be received. If the full length of the command is not received, then the method may repeat with Step 801 to receive command data for the command on the bus.

If the full length of the command is received, then a kick is issued in Step 813 in one or more embodiments of the invention. Issuing a kick may be performed by accessing the TVL mapping table to identify the TVL corresponding to the command. Specifically, from the TVL mapping table the TVL or set of TVLs corresponding to the underlying function is identified. If a set of TVLs are identified, then a TVL may be selected from the set of TVLs, such as by using a load balancing protocol. The virtual kick list corresponding to the selected TVL is identified and an identifier of the PCB having the command is stored in the virtual kick list. When the identifier of the PCB is in the virtual kick list, the command is deemed ready for processing by the non-blocking pipeline in one or more embodiments of the invention.

In Step 815, the scoreboard is updated. Updating the scoreboard may be performed by storing the result of the operation performed in 811 in the scoreboard. Specifically, in one or more embodiments of the invention, a bitwise "OR" operation is performed on the previous value of the scoreboard and the scoreboard mask to create a result. The result is written as a new value for the scoreboard in one or more embodiments of the invention. In one or more embodiments of the invention, after the length field is received and if a kick is not issued, the scoreboard has the unused bits set.

Figure 9:
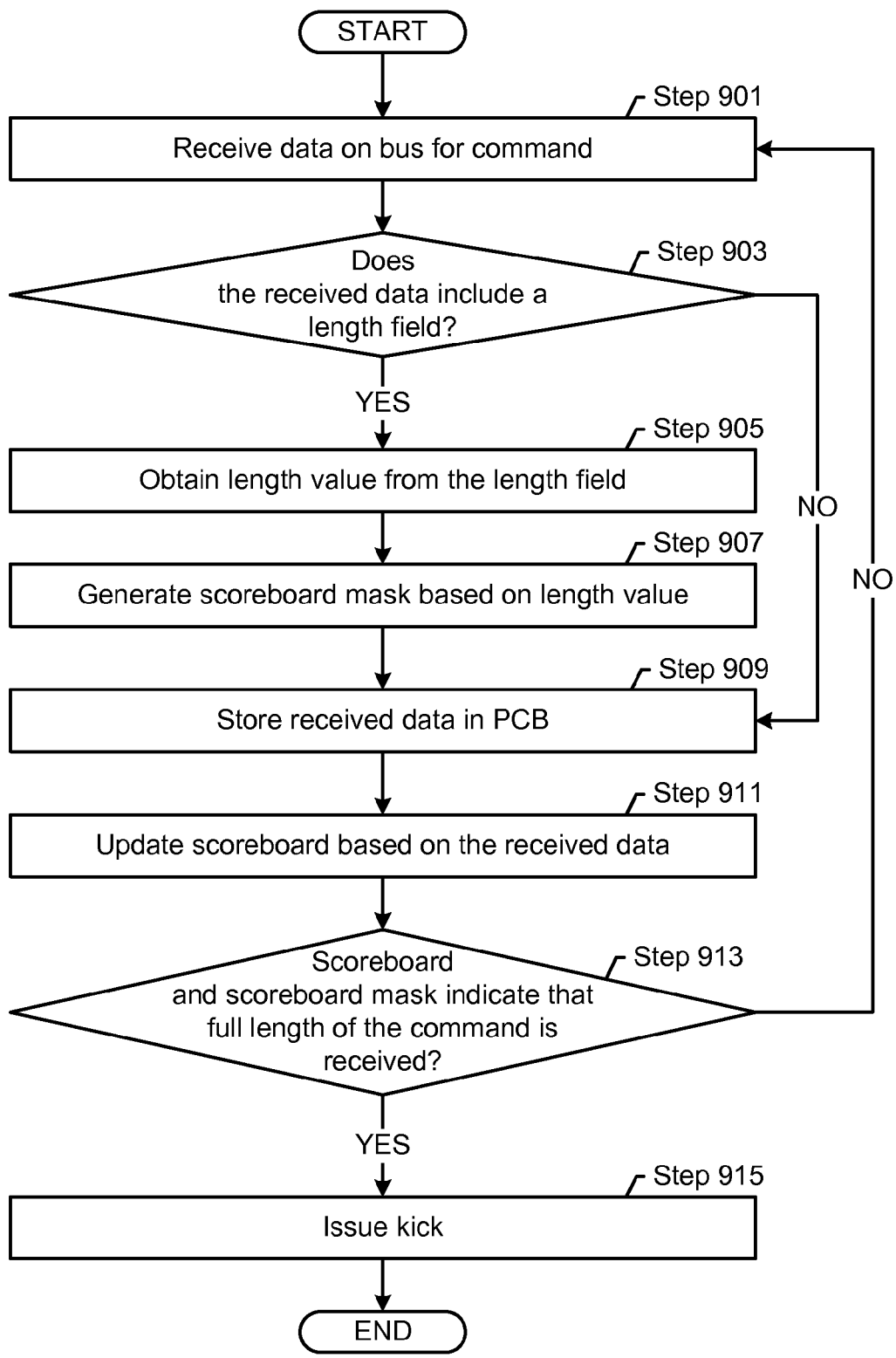

FIG. 9 shows an alternative flowchart for receiving command data and generating a kick in one or more embodiments of the invention. In one or more embodiments of the invention, prior to setting a bit in the scoreboard when a new command is received, the scoreboard and the scoreboard mask is reset. In FIG. 9, steps 901, 903, 905, 909, 913, and 915 may be performed as discussed above with reference to Steps 801, 803, 805, 809, 811, and 813, respectively, of FIG. 8. Specifically, in Step 901, command data is received on the PCI express fabric bus. In Step 903, a determination is made about whether the received command data includes a length field. In Step 905, if the received command data includes a length field, the length value is obtained from the length field. In Step 907, based on the length value, a scoreboard mask is generated. In the alternative flowchart, in one or more embodiments of the invention, the scoreboard masks has the unused bits set and the remaining bits not set until a kick is issued. In other words, the scoreboard mask, in the alternative flowchart, is only used to mask the unused bits. In Step 909, regardless of whether the received command data includes a length field, the received command data without the length field is stored in the PCB.

In Step 911, the scoreboard is updated based on the received data. In one or more embodiments of the invention, the scoreboard is directly updated by the collect buffer controller. Updating the scoreboard may be performed by identifying based on the address of the command data, the segment of the header buffer or the payload buffer being populated. The bit corresponding to the identified segment is set in the scoreboard in one or more embodiments of the invention.

In Step 913, a determination is made about whether the scoreboard and the scoreboard mask indicate that the full length of the command is received. If the full length of the command is not received, then the method may repeat with Step 901 to receive command data for the command on the bus. If the full length of the command is received, then a kick is issued in Step 915 in one or more embodiments of the invention.

Figure 10:
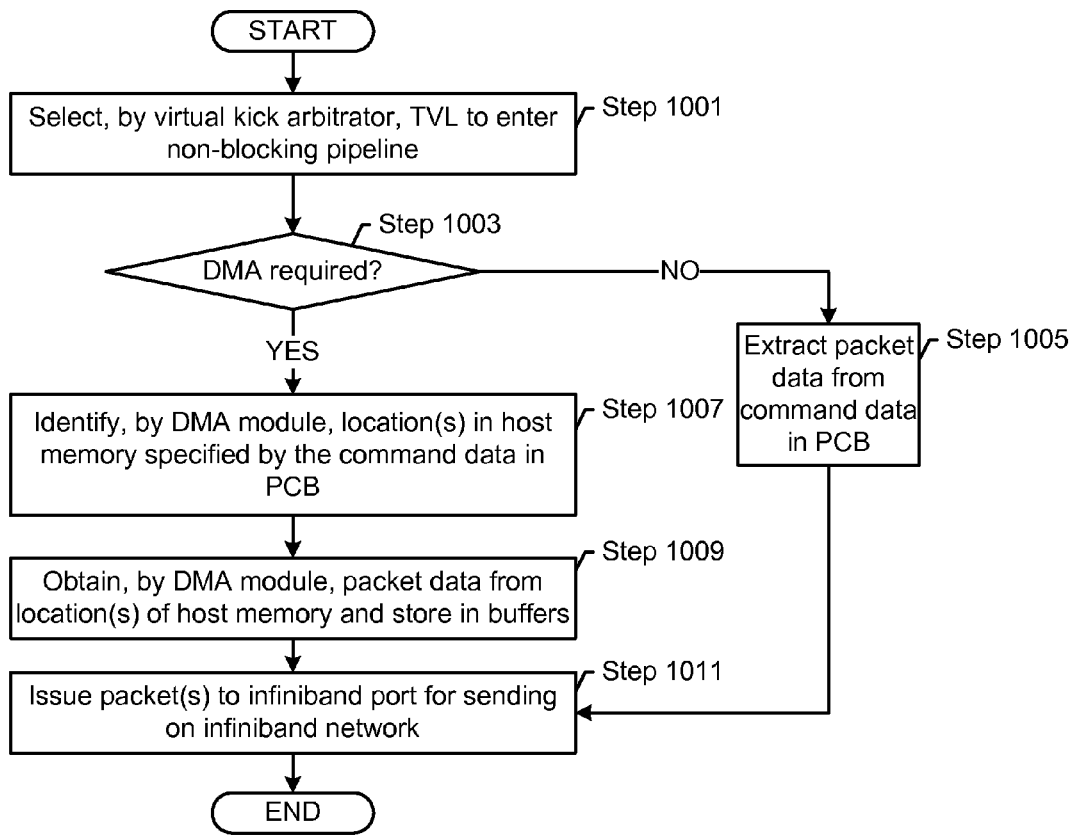

FIG. 10 shows a flowchart for processing the command through a non-blocking pipeline in one or more embodiments of the invention. In Step 1001, the virtual kick arbitrator selects a TVL to enter the non-blocking pipeline. The virtual kick arbitrator may select the TVL in accordance with a load balancing protocol. For example, the load balancing protocol may be round robin, weighted round robin, etc.

In Step 1003, a determination is made about whether DMA is required. In one or more embodiments of the invention, the host channel adapter supports DMA between the host memory and the host channel adapter. For example, command data sent to the host channel adapter may include the packet data for packets to send on the Infiniband® network. In such a scenario, in Step 1005, if DMA is not required, then the packet data is extracted from the command in the PCB.

Alternatively, the command data may specify a location in host memory, such as the location of packet data. If the command data specifies a location in host memory, then DMA is required to obtain the command data. In Step 1007, a DMA module identifies one or more locations in host memory that are specified in the command data in the PCB. In Step 1009, the DMA module obtains the packet data from the one or more locations in host memory and stores the packet data into buffers. In one or more embodiments of the invention, as part of obtaining the packet data, the DMA may perform validation to ensure that the host process sending the command has necessary permissions to obtain the packet data.

In Step 1011, regardless of whether DMA is performed to obtain the packet data, the packets are issue to the Infiniband® port for sending on the Infiniband® network. In particular packets are generated from the packet data. The generating of the packets may include performing various levels of identification and validation, such as validating the send queue sending the packet(s) and the receive queue receiving the packet(s).

Figure 11A:
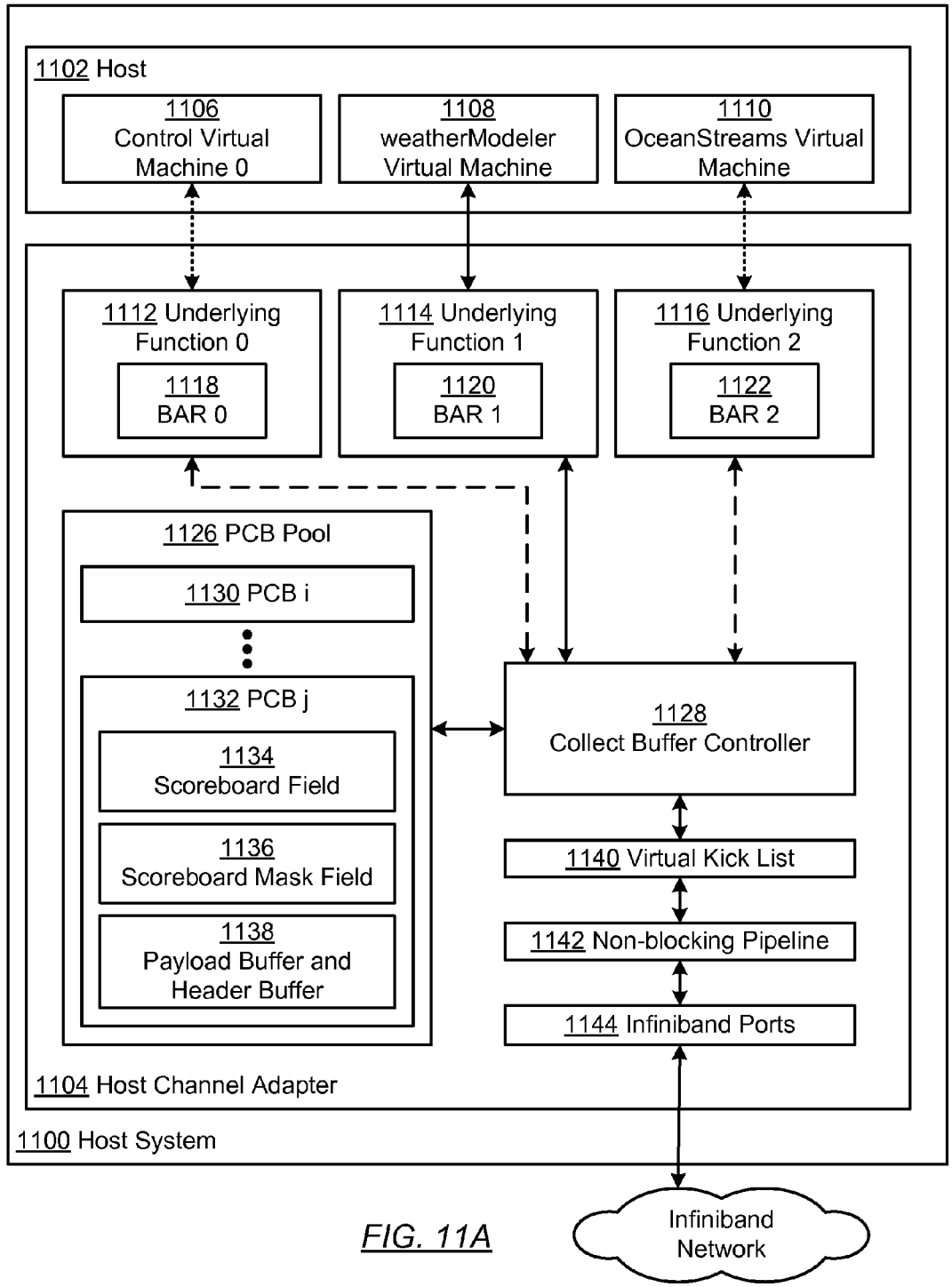

FIGS. 11A-11B shows an example in one or more embodiments of the invention. The following example is for explanatory purposes only and not intended to limit the scope of the invention. Turning to FIG. 11A, in the following example, consider the scenario in which the host system (1100) has a host (1102) and a host channel adapter (1104). The host (1102) executes a control virtual machine (1106), a guest virtual machine for executing the applications of a company called weatherModeler (i.e., weatherModeler virtual machine (1108)), and a guest virtual machine for executing the applications of a company called OceanStreams (i.e., OceanStreams virtual machine (1110)).

Each virtual machine is associated with an underlying function. For example, the control virtual machine is associated with underlying function 0 (1112). The weatherModeler virtual machine is associated with underlying function 1 (1114). The OceanStreams virtual machine (1110) is associated with underlying function 2 (1116). Each underlying function has a corresponding BAR (e.g., BAR 1 ((1118)), BAR 1 ((1120)), BAR 2 ((1122))). In one or more embodiments of the invention, the BAR defines which underlying function is writing to a PCB in the PCB pool (1126).

In the example, consider the scenario in which a process in the weatherModeler virtual machine (1108) wants to send a command on the Infiniband® network (1124). In the example, the process, through the weatherModeler virtual machine operating system (not shown) and virtual host channel adapter device driver (not shown), writes the command to a virtual address of a VCB. The command is sent over time as a series of command data. The command data may be sent in order or out of order.

When the collect buffer controller (1128) receives the first command data directed to the VCB, the collect buffer controller (1128) determines that the VCB is not yet bound to a PCB (e.g., PCB i (1130), PCB j (1132)). Based on PCB j (1132) in the PCB pool (1126) being available, the collect buffer controller (1128) selects PCB j (1132). At this stage, with each command data received, the collect buffer controller (1128) may start updating the scoreboard field (1134), the scoreboard mask field (1136), the payload buffer and the header buffer (1138).

Continuing with the example, FIG. 11B shows a chart showing the example updates to the scoreboard field and the scoreboard mask field in one or more embodiments of the invention. In the chart, column 1 (1150) lists the sequence of command data. Specifically, each row represents a step in the sequence of command data. Column 2 (1152) shows the scoreboard in the scoreboard field when the command data in the sequence is received. Column 3 (1154) shows the scoreboard mask based on the receipt of the command data. Column 4 (1156) shows the result of a check to determine whether to issue a kick. Column 5 (1158) shows the value written to the scoreboard in one or more embodiments of the invention. In the chart, the scoreboard, scoreboard mask, result of the scoreboard check, and the write are all presented in hexadecimal format. Further, the use of 40'h in FIG. 11B means that the hexadecimal number represents a 40 bit number. The use of 12'h means that the hexadecimal number represents a 12 bit number.

In Step 1, an initialization is performed as shown in Step 1, column 1 (1150). Specifically, as shown in Step 1, column 5 (1158), the value of "00_0000_0000" is written to the scoreboard. At this stage, all bits in the scoreboard are reset. Further, the scoreboard mask will be overwritten with each subsequent command data in one or more embodiments of the invention. In one or more embodiments of the invention, the scoreboard may be reset immediately upon issuing a kick for the previous command received in the PCB and/or as part of initiating processing of a new command.

In Step 2, command data at page offset 12'h10 is received as shown in Step 2, column 1 (1150). When the command data at page offset 12'h10 is received, based on Step 1, the scoreboard is "00_0000_0000" as shown in Step 2, column 2 (1152). Based on the page offset, the bit in the scoreboard mask corresponding to the segment received is set. Thus, the value of the scoreboard mask is "00_0000_0004" as shown in Step 2, column 3 (1154). After updating the scoreboard mask, a determination is made about whether the scoreboard and the scoreboard mask indicate that the entire command is received. Performing bitwise "OR" operation on the scoreboard and the scoreboard mask yields a scoreboard check result of "00_0000_0004" as shown in Step 2, column 4 (1156). "00_0000_0004" means that not all bits are set (i.e., the value of the scoreboard check result is not "ff_ffff_ffff"). Because not all bits are set, a kick is not issued. Further, the result (i.e., "00_0000_0004") is written to the scoreboard as shown in Step 2, column 5 (1158).

In Step 3, command data at page offset 12'h20-0x38 is received as shown in Step 3, column 1 (1150). When the command data at page offset 12'h20-0x38 is received, based on Step 2, the scoreboard is "00_0000_0004" as shown in Step 3, column 2 (1152). Based on the page offset, the bit in the scoreboard mask corresponding to the segment received is set. Thus, the value "00_0000_00f0" is written to the scoreboard mask as shown in Step 3, column 3 (1154). After updating the scoreboard mask, a determination is made about whether the scoreboard and the scoreboard mask indicate that the entire command is received. Performing bitwise "OR" operation on the scoreboard and the scoreboard mask yields a scoreboard check result of "00_0000_00f4" as shown in Step 3, column 4 (1156). Because "00_0000_00f4" means that not all bits are set, a kick is not issued. Further, the result (i.e., "00_0000_00f4") is written to the scoreboard as shown in Step 3, column 5 (1158).

In Step 4, command data at page offset 12'h0 is received as shown in Step 4, column 1 (1150). The command data further includes a length field indicating that the length is 16 B as shown in Step 4, column 1 (1150). When the command data at page offset 12'h0 is received, based on Step 3, the scoreboard is "00_0000_00f4" as shown in Step 4, column 2 (1152). Based on the length field, the value "ff_ffff_fc01" is written to the scoreboard mask as shown in Step 4, column 3 (1154). After updating the scoreboard mask, a determination is made about whether the scoreboard and the scoreboard mask indicate that the entire command is received. Performing bitwise "OR" operation on the scoreboard and the scoreboard mask yields a scoreboard check result of "ff_ffff_fcf5" as shown in Step 4, column 4 (1156). Because "ff_ffff_fcf5" means that not all bits are set, a kick is not issued. Further, the result (i.e., "ff_ffff_fcf5") is written to the scoreboard as shown in Step 4, column 5 (1158).

In Step 5, command data at page offset 12'h8 is received as shown in Step 5, column 1 (1150). When the command data at page offset 12'h8 is received, based on Step 4, the scoreboard is "ff_ffff_fcf5" as shown in Step 5, column 2 (1152). Based on the page offset, the bit in the scoreboard mask corresponding to the segment received is set. Thus, the value "00_0000_0002" is written to the scoreboard mask as shown in Step 5, column 3 (1154). After updating the scoreboard mask, a determination is made about whether the scoreboard and the scoreboard mask indicate that the entire command is received. Performing bitwise "OR" operation on the scoreboard and the scoreboard mask yields a scoreboard check result of "ff_ffff_fcf7" as shown in Step 5, column 4 (1156). Because "ff_ffff_fcf7" means that not all bits are set, a kick is not issued. Further, the result (i.e., "ff_ffff_fcf7") is written to the scoreboard as shown in Step 5, column 5 (1158).

In Step 6, command data at page offset 12'h18 is received as shown in Step 6, column 1 (1150). When the command data at page offset 12'h18 is received, based on Step 5, the scoreboard is "ff_ffff_fcf7" as shown in Step 6, column 2 (1152). Based on the page offset, the bit in the scoreboard mask corresponding to the segment received is set. Thus, the value "00_0000_0008" is written to the scoreboard mask as shown in Step 6, column 3 (1154). After updating the scoreboard mask, a determination is made about whether the scoreboard and the scoreboard mask indicate that the entire command is received. Performing bitwise "OR" operation on the scoreboard and the scoreboard mask yields a scoreboard check result of "ff_ffff_fcff" as shown in Step 6, column 4 (1156). Because "ff_ffff_fcff" means that not all bits are set, a kick is not issued. Further, the result (i.e., "ff_ffff_fcff") is written to the scoreboard as shown in Step 6, column 5 (1158).

In Step 7, command data at page offset 12'h40-12h'48 is received as shown in Step 7, column 1 (1150). When the command data at page offset 12'h40-12h'48 is received, based on Step 6, the scoreboard is "ff_ffff_fcff" as shown in Step 7, column 2 (1152). Based on the page offset, the bit in the scoreboard mask corresponding to the segment received is set. Thus, the value "00_0000_0030" is written to the scoreboard mask as shown in Step 7, column 3 (1154). After updating the scoreboard mask, a determination is made about whether the scoreboard and the scoreboard mask indicate that the entire command is received. Performing bitwise "OR" operation on the scoreboard and the scoreboard mask yields a scoreboard check result of "ff_ffff_ffff" as shown in Step 7, column 4 (1156). The value of "ff_ffff_ffff" means that all bits are set. Accordingly, a kick is issued. In one or more embodiments of the invention, issuing the kick means that the command is received on the host channel adapter and ready to process on the non-blocking pipeline.

Returning to FIG. 11A, upon determining that all bits in PCB j (1132) are set, the collect buffer controller (1128) adds an identifier of PCB j (1132) to the virtual kick list (1140). At this stage, the command is ready for processing on the non-blocking pipeline (1142). Specifically, when the command becomes the highest priority command in the virtual kick list(s) (1140) (e.g., by being the oldest, etc.), the command is processed. Processing the command includes generating packets based on the received command data and transmitting the packets on the Infiniband® network (1124) via the Infiniband® ports (1144).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing commands on a host channel adapter, the method comprising:

receiving, by the host channel adapter, data in a command from a host connected to the host channel adapter, wherein the command comprises an instruction, an identification of packet data, and a length field;

extracting, by the host channel adapter, a length of the command from the length field in the data;

generating a scoreboard mask based on the length, wherein the scoreboard mask comprises unused bits in the scoreboard preset; and setting, with each portion of the data received, a bit in a scoreboard to identify the portion of data received;

determining that a size of the data received for the command matches the length using the scoreboard by:

performing a bitwise "or" operation on the scoreboard and the scoreboard mask to obtain a result, and determining that all bits of the result are set;

issuing, by the host channel adapter, a kick on the host channel adapter when the size of the data received for the command matches the length;

executing, by the host channel adapter and in response to the kick, the instruction on a pipeline to initiate sending the packet data; and sending, by the host channel adapter, the packet data on a network.

2. The method of claim 1, wherein receiving the data comprises:

receiving, from a virtual machine, a write of the data to a virtual collect buffer, wherein the virtual collect buffer is one of a limited number of virtual collect buffers allocated to the virtual machine, and wherein the method further comprises:

determining, by the host channel adapter, that a physical collect buffer is available upon receiving a first portion of the data;

locking the physical collect buffer to the virtual collect buffer based on the physical collect buffer being available;

storing the first portion of the data and the subsequent portions of the data in the physical collect buffer based on the virtual collect buffer being locked to the physical collect buffer; and unlocking the physical collect buffer when the command is executed on the pipeline.

3. The method of claim 1, wherein the identification of packet data comprises the packet data.

4. The method of claim 1, wherein the identification of packet data identifies at least one location in memory comprising the packet data.

5. The method of claim 2, wherein each virtual collect buffer of the limited number of virtual collect buffers is located on a separate page.

6. The method of claim 2, wherein issuing the kick comprises:

storing an address of the physical collect buffer in a virtual kick list, and wherein commands are executed in the pipeline in an order defined by the virtual kick list.

7. A host channel adapter comprising:

a physical collect buffer comprising:

a payload buffer configured to store a payload of a command;

a header buffer configured to store a header of the command;

a scoreboard field configured to store a scoreboard for tracking which portion of the command is received; and a scoreboard mask field configured to store a scoreboard mask for masking bits of the scoreboard based on a length of the command;

a collect buffer controller operatively connected to the physical collect buffer and configured to:

receive data in a command from a host connected to the host channel adapter, wherein the command comprises an instruction, an identification of packet data, and a length field;

extract a length of the command from the length field in the data;

generate the scoreboard mask based on the length;

store the data in the physical collect buffer;

set, with each portion of the data received, a bit of the scoreboard to identify the portion of data received; and issue a kick on the host channel adapter when the scoreboard and the scoreboard mask indicate that all command data of the command is received; and a hardware pipeline configured to:

execute, in response to the kick, the instruction to initiate sending the packet data.

8. The host channel adapter of claim 7, further comprising:

a port configured to:

send the packet data on a network.

9. The host channel adapter of claim 7, further comprising:

a port data collector operatively connected to the collect buffer controller and configured to:

receive, from a virtual machine, a write of the data to a virtual collect buffer, wherein the virtual collect buffer is one of a limited number of virtual collect buffers allocated to the virtual machine, and wherein the collect buffer controller is operatively connected to the port data collector and further configured to bind the physical collect buffer to the virtual collect buffer.

10. The host channel adapter of claim 7, further comprising:

a virtual kick list configured to store, when the kick is received, an address of the physical collect buffer in a virtual kick list.

11. The host channel adapter of claim 7, further comprising:

a doorbell checksum state configured to store a checksum.

12. The host channel adapter of claim 7, further comprising:

a collect group table configured to store a mapping between physical collect buffers and underlying functions.

13. The host channel adapter of claim 7, further comprising:

a free physical collect buffer controller configured to store a list of available physical collect buffers.

14. The host channel adapter of claim 7, further comprising:

an underlying function table configured to store a mapping of underlying functions to offsets of a virtual address space.

15. The host channel adapter of claim 9, wherein each virtual collect buffer of the limited number of virtual collect buffers is located on a separate page.

16. An integrated circuit comprising:

a physical collect buffer comprising:

a payload buffer; and a header buffer; and a collect buffer controller configured to:

receive data in a command from a host connected to the host channel adapter, wherein the command comprises an instruction, an identification of packet data, and a length field;

extract a length of the command from the length field in the data;

generate a scoreboard mask based on the length, wherein the scoreboard mask comprises unused bits in the scoreboard preset;

store the data in the physical collect buffer;

set, with each portion of the data received, a bit in a scoreboard to identify the portion of data received;

determine that a size of the data received for the command matches the length using the scoreboard by:

performing a bitwise "or" operation on the scoreboard and the scoreboard mask to obtain a result, and determining that all bits of the result are set; and issue a kick on the host channel adapter when the size of the data received for the command matches the length, wherein, in response to the kick, the instruction is executed and sent on the network.

17. The integrated circuit of claim 16, further comprising:
a free physical collect buffer controller configured to store a list of available physical collect buffers.

18. The integrated circuit of claim 16, further comprising:
an underlying function table configured to store a mapping of underlying functions to offsets of a virtual address space.

19. The integrated circuit of claim 16, further comprising:
a collect group table configured to store a mapping between physical collect buffers and underlying functions.

* * * * *

UNITED STATES PATENT AND TRADEMARK OFFICE
CERTIFICATE OF CORRECTION

| | | |
|---|---|---|
| PATENT NO. | : 8,589,610 B2 | Page 1 of 1 |
| APPLICATION NO. | : 13/149436 | |
| DATED | : November 19, 2013 | |
| INVENTOR(S) | : Manula et al. | |

It is certified that error appears in the above-identified patent and that said Letters Patent is hereby corrected as shown below:

In the Specification

In column 1, line 21, delete "fabric" and insert -- fabric. --, therefor.

In column 3, line 58, delete "machine" and insert -- machine. --, therefor.

In column 4, line 51, delete "machine" and insert -- machine. --, therefor.

In column 5, line 23, delete "machine" and insert -- machine. --, therefor.

In column 6, line 30, delete "machine" and insert -- machine. --, therefor.

In column 6, line 33, delete "machine" and insert -- machine. --, therefor.

In column 6, line 42, delete "machine" and insert -- machine. --, therefor.

In column 7, line 22, delete "machine" and insert -- machine. --, therefor.

In column 14, line 43, delete "machine" and insert -- machine. --, therefor.

Signed and Sealed this
Tenth Day of June, 2014

Michelle K. Lee
*Deputy Director of the United States Patent and Trademark Office*